United States Patent
Minkovitch

(10) Patent No.: US 9,713,764 B2
(45) Date of Patent: Jul. 25, 2017

(54) METHOD, SYSTEM AND APPARATUS FOR MANAGING A FOOTBALL MATCH

(76) Inventor: Zvi Minkovitch, Modiin (IL)

( * ) Notice: Subject to any disclaimer, the term of this patent is extended or adjusted under 35 U.S.C. 154(b) by 85 days.

(21) Appl. No.: 14/235,854

(22) PCT Filed: Aug. 6, 2012

(86) PCT No.: PCT/IB2012/002000
§ 371 (c)(1),
(2), (4) Date: Jan. 29, 2014

(87) PCT Pub. No.: WO2013/017957
PCT Pub. Date: Feb. 7, 2013

(65) Prior Publication Data
US 2014/0179384 A1    Jun. 26, 2014

Related U.S. Application Data

(60) Provisional application No. 61/514,907, filed on Aug. 4, 2011.

(51) Int. Cl.
| | |
|---|---|
| G07C 1/22 | (2006.01) |
| A63F 13/90 | (2014.01) |
| G06Q 10/00 | (2012.01) |

(52) U.S. Cl.
CPC ............ *A63F 13/08* (2013.01); *G06Q 10/00* (2013.01)

(58) Field of Classification Search
CPC ............ A63B 71/0669; A63B 71/0616; A63B 2071/0661; A63B 2225/50
USPC ...................................... 463/42, 46
See application file for complete search history.

(56) References Cited

U.S. PATENT DOCUMENTS

| | | | |
|---|---|---|---|
| 5,636,920 A * | 6/1997 | Shur et al. ................... 700/91 |
| 5,898,587 A * | 4/1999 | Bell et al. ................... 700/92 |
| 6,122,559 A | 9/2000 | Bohn | |
| 6,984,176 B2 * | 1/2006 | Bishop .......................... 463/42 |
| 7,037,198 B2 * | 5/2006 | Hameen-Anttila ............ 463/41 |
| 7,277,361 B1 | 10/2007 | Baba | |
| 7,289,083 B1 | 10/2007 | Canova | |
| 7,479,949 B2 * | 1/2009 | Jobs et al. ................ 345/173 |
| 7,616,098 B2 * | 11/2009 | Al-Sabah ............. 340/323 R |
| 7,646,914 B2 * | 1/2010 | Clausi et al. ............... 382/187 |
| 2003/0027629 A1 | 2/2003 | Pimienta | |

(Continued)

FOREIGN PATENT DOCUMENTS

WO    2010030737 A1    3/2010

OTHER PUBLICATIONS www.glovers-scorebooks.com/soccer.htm, May 15, 2010.*

(Continued)

*Primary Examiner* — Michael Cuff
(74) *Attorney, Agent, or Firm* — May Patents Ltd.

(57) ABSTRACT

A system, method and apparatus for managing a football match on a hand held computerized device is presented. The hand held computerized devices includes a first display screen disposed substantially opposite a second display screen. Pre-match information for a first team and a second team are entered into the hand held computer device. Match related events, such as goals, penalties and substitutions are entered on the hand held computer device. The device compiles match events and said pre-match information into a match log, and wirelessly transmits the match log to a receiver, such as a match following device.

20 Claims, 32 Drawing Sheets

(56) References Cited

U.S. PATENT DOCUMENTS

| | | | |
|---|---|---|---|
| 2008/0172374 A1 | 7/2008 | Wolosin et al. | |
| 2009/0131174 A1* | 5/2009 | Hutchinson-Kay et al. | 463/42 |
| 2009/0268483 A1* | 10/2009 | Donahue | B43L 1/006 |
| | | | 362/602 |
| 2010/0102938 A1* | 4/2010 | Delia et al. | 340/326 |
| 2010/0210244 A1 | 8/2010 | Andreasson et al. | |
| 2011/0098083 A1* | 4/2011 | Lablans | 455/556.1 |
| 2011/0218854 A1* | 9/2011 | Shamlian | 705/14.49 |
| 2013/0297403 A1* | 11/2013 | Manning | G06Q 30/02 |
| | | | 705/14.39 |

OTHER PUBLICATIONS

"I, Referee" mobile app, Dec. 23, 2009.*
ISR of corresponding PCT application, mailed Mar. 22, 2013—2 pages.
Supplementary European Search Report of corresponding EP application No. 12819249, dated Mar. 19, 2015 (2 pages).

* cited by examiner

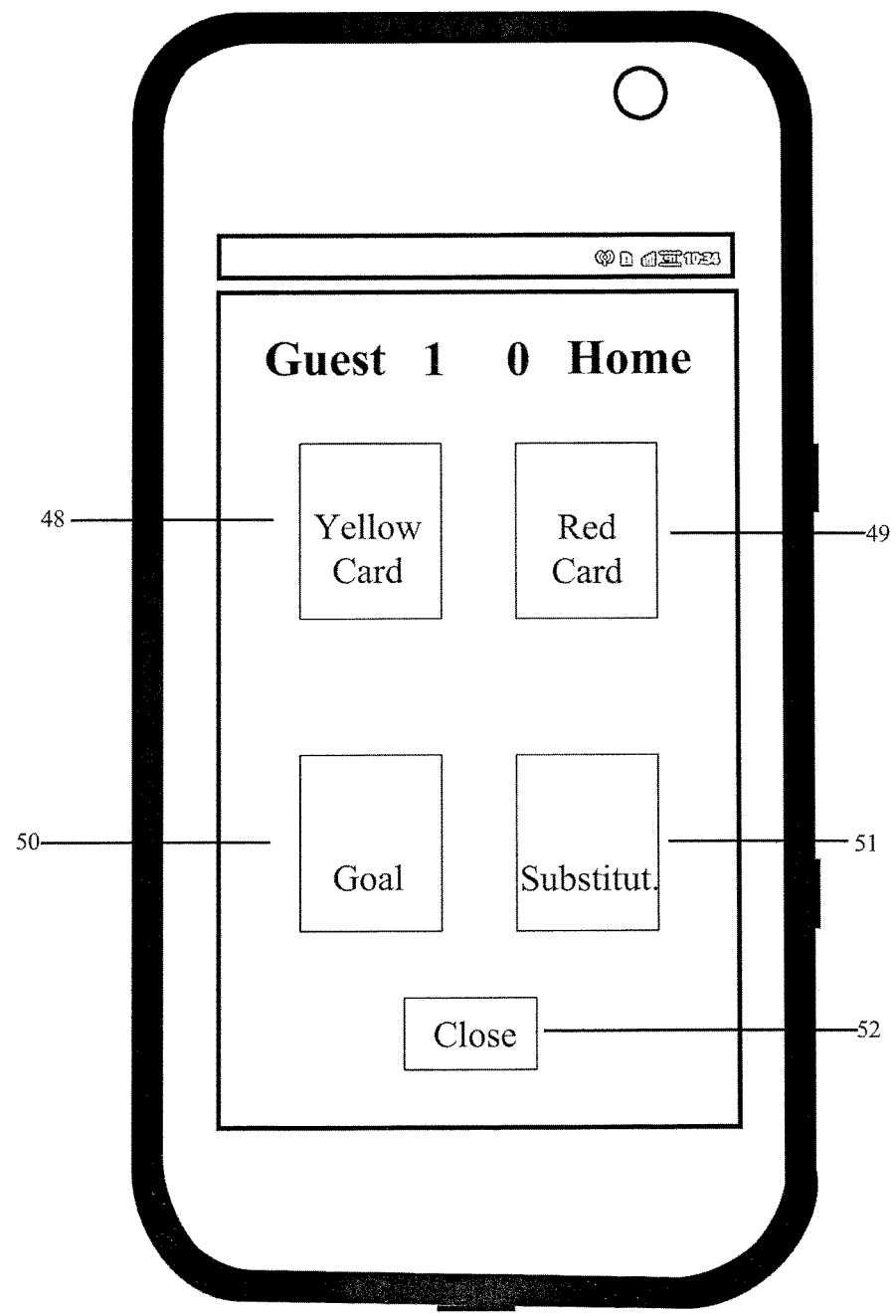

METHOD, SYSTEM AND APPARATUS FOR MANAGING A FOOTBALL MATCH

FIELD OF THE INVENTION

The present invention relates to sporting events, and more particularly, is related to on-field management of football matches.

BACKGROUND OF THE INVENTION

Traditionally, a football referee may use several tools to manage a football match. For example, a coin to toss deciding the team initially in possession of the ball, red and yellow cards to indicate penalties and warnings, and watches to keep track of the game time and the accumulation of stoppage time. During the match the referee may also use a writing instrument and paper to record information such as the time of a goal and the scoring team, player substitutions, writing yellow and/or red penalty cards, and other information. After a match, the referee has generally manually compiled information about the match so it may be recorded, for example, by team officials, league officials, and reported in the press. Such a compilation process may be time consuming, and may include inaccuracies as the referee attempts to reconstruct the events of the match after the fact.

In addition, many observers of football matches often independently record their own observations during a football match, and then may afterward reconcile their observations with the official record. Football fans unable to attend a match may be eager to keep abreast of a match while it is in progress, without having to wait for a reporter to post his observations.

Therefore, there is a need in the industry to address the above-mentioned shortcomings.

SUMMARY OF THE INVENTION

Embodiments of the present invention provide a method, system and apparatus for managing a football match. Briefly described, the present invention is directed to a method for managing a football match on a hand held computer device comprising a first display screen disposed substantially opposite a second display screen, comprising the steps of: entering pre-match information for a first team and a second team into the hand held computer device; recording a plurality of match events on the hand held computer device; compiling the plurality of match events and the pre-match information into a match log; and wirelessly transmitting, by the computer device, the match log to a receiver.

For the purposes of this application, the term "football" is used as per the international usage indicating a sport with a round football and two netted goals, as distinguished from American football (where football is known as "soccer") or Australian rules football. The terms "match" and "game" are used interchangeably to refer to a complete football match. The term "selecting" refers to activating an object on a display screen, for example, touching the screen over an icon or button on a touch screen, or moving a mouse/touchpad icon over a screen object and clicking the mouse or touch pad button. The term "entering" refers to the process of inputting data into a device, for example, by typing text on a real or virtual keyboard or keypad, or downloading data files from an external device.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 13A is a schematic diagram of an activity chooser screen.

DETAILED DESCRIPTION

Figure 1A:
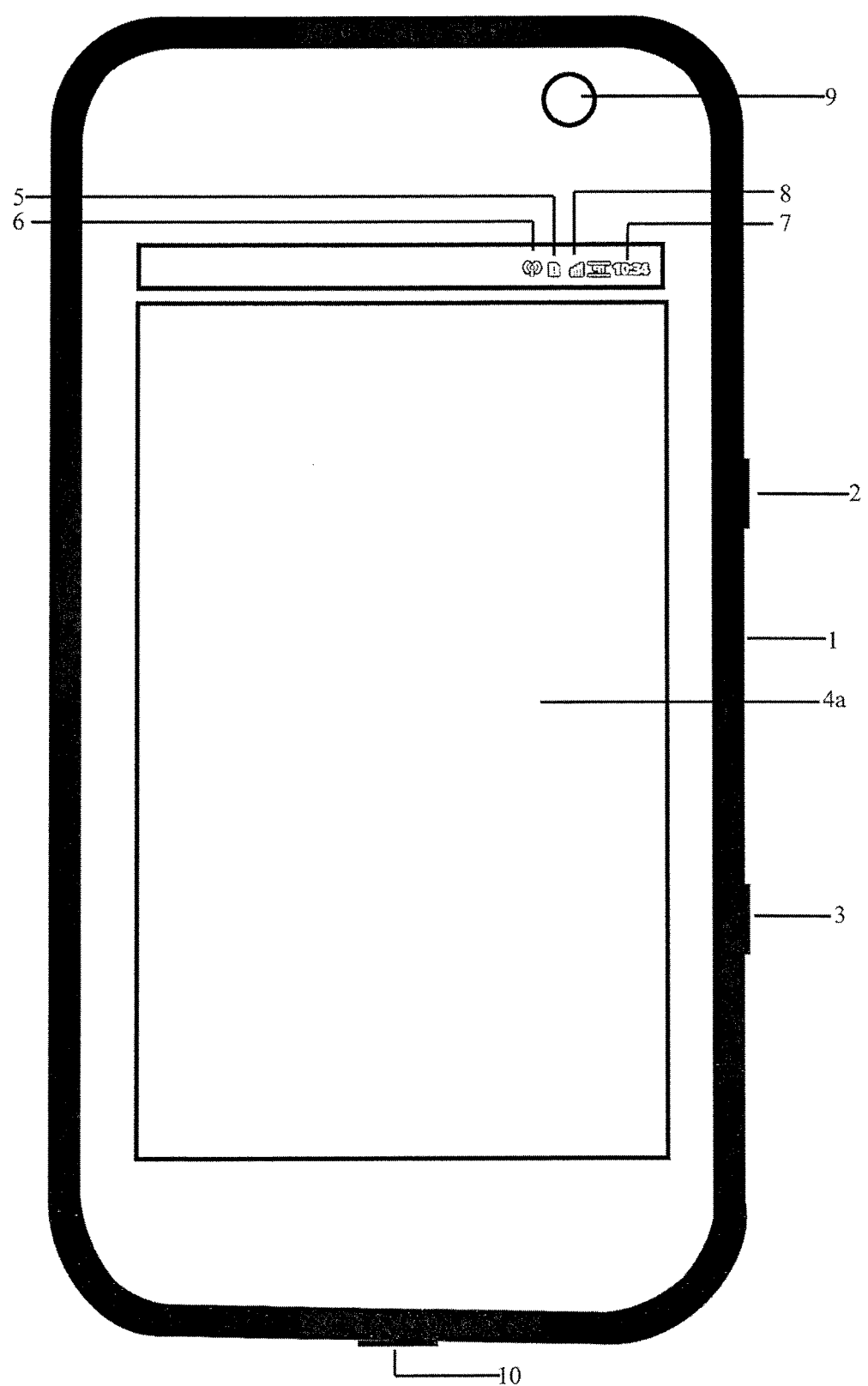
FIG. 1A is a schematic diagram showing a front view of an exemplary housing for a match management system.

Reference will now be made in detail to embodiments of the present invention, examples of which are illustrated in the accompanying drawings. Wherever possible, the same reference numbers are used in the drawings and the description to refer to the same or like parts.

Exemplary embodiments of a system, method and apparatus for managing a football match are presented. Under a first exemplary embodiment, a football match management (FB-MM) system is generally accessed via a wireless hand held computing device, such as a tablet computer or smart phone. A user, for example, a football match referee, inputs information pertaining to the specific football match to be played, for example, the team names, player names and/or numbers, and the scheduled length of time for the match. The information may be manually input by the user, or downloaded to the system from external sources, for example, a data file or a web site. The management system may simulate a coin flip to determine which team has initial possession of the ball. The user may then signify the start of the match to start a match clock. The user may then interact with the system during the match to manage all aspects of the match, for example, scores, penalties, player and substitutions. The system may record times when match officials blow a whistle to track the sequence of events during the match. At the conclusion of the match, a match report is generated summarizing the events of the match.

The system publishes information pertaining to the match as the match is in progress, so that third parties may access the information, for example, through a web site or a smart phone application. Similarly, the system may publish the match report after the match.

The system may be executed on a portable computing device, for example but not limited to, a computer tablet and/or a smart phone. The portable computing device is generally in communication with a network via wireless communications methods familiar to persons having ordinary skill in the art, for example, WIFI, satellite communications, Bluetooth, ZigBee, or other wireless methods. However, there is no objection to implementations where the portable computing device is used to manage the match, and thereafter is physically connected to a communications network device to share the match information over the network.

FIG. 1A shows a front view of a first embodiment of an exemplary housing for a football management apparatus under the first embodiment. The housing 1 of the FB-MM may be made of various materials familiar to persons having ordinary skill in the art, for example, solid or flexible materials, and opaque or transparent materials. The housing may be, for example, a smartphone, tablet or any computerized platform capable of executing a FB-MM program and carry out all the features of the program that conforms to requirements of a football organizing body, for example the International Football Association Board (IFAB) and Federation Internationale de Football Association (FIFA).

The housing may include a main power (on/off) switch 2, usable to start and stops operation of the FB-MM program. A standby switch 3 may be, for example, a touch indicator to put the device in a low power sleep mode for saving energy and to bring it out of sleep mode to full active mode. A main touch color screen 4a may conform to standards, demands and regulations defined by the IFAB and/or by FIFA, such as: shape, size, screen brightness, screen illumination, screen resolution, visibility of figures and digits, icons and all data screened on, in any light conditions, in any weather condition, day and night, under daylight or under artificial light used in stadiums, and water resistance so it can be used and read in rainy conditions. Physical strength, durability against physical condition such as heat, cold, rain, water, shocks, pressure, hits, that can occur when used to fully perform and functions in physical conditions which may be present during a football match.

The apparatus under the first embodiment may execute the FB-MM system under very active physical usage conditions. Therefore, the FB-MM system is programmed to protect and prevent the screen 4a from accidently or unintended operating, before, during and after the match by shutting down the screen touch sensor automatically at a decided period of time or manually upon decision of the operator.

Figure 1B:
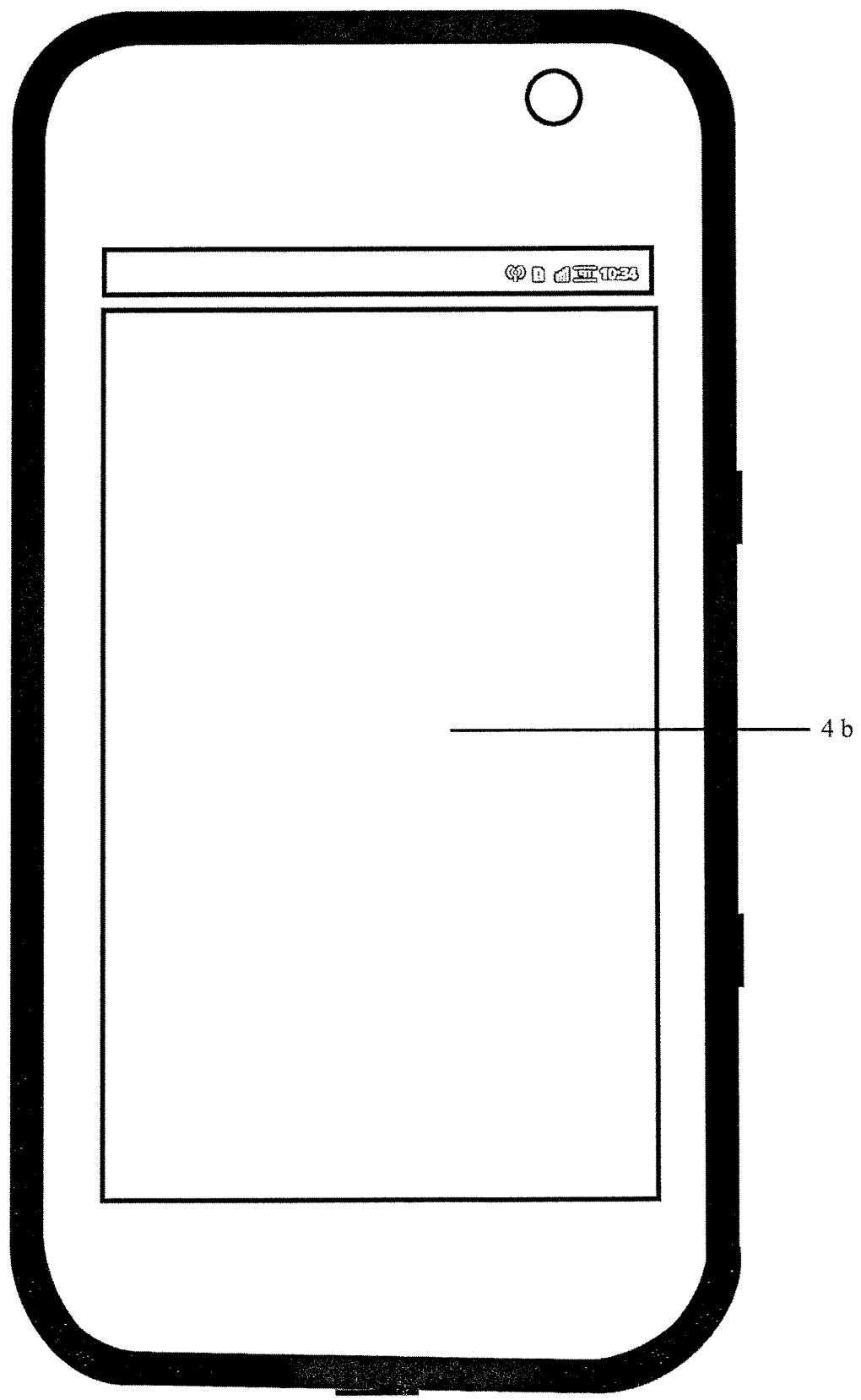
FIG. 1B is a schematic diagram showing a rear view of an exemplary housing for an apparatus executing a match management system.

FIG. 1B shows a rear view of an exemplary housing for a football management system under the first embodiment. A rear color screen 4b meets the same characteristics and standards as the main front screen 4a. The screens 4a, 4b may be a double sided screen made from two screens, or one screen that displays from both the front and the rear, or a translucent screen, as long as it presents data on both sides. The two sided screen 4a, 4b allows viewing of almost 360 degree of data. This feature is mainly used to facilitate displaying a yellow/red card warning by illuminating the chosen yellow/red card color with so a player or players may be warned and the rest of the participants in the game and the spectators are similarly notified of the warning act. The rear color screen 4b may also be used as secondary back up screen in case of malfunction of the main screen and for any purposes the operator may choose.

Returning to FIG. 1A, an operation phase status indicator 5 indicates whether the system is functioning normally or not. The phase status indicator 5 is green colored if the system is acting normally, or red if there is a malfunction.

A transmitting/receiving status indicator 6 indicates the intensity of the signal of live transmitting/receiving distance and quality of signal detected by the FB-MM. The FB-MM can transmit and receive any data and any kind of signals in and out the stadium on demand and by decision of the referee or any authorized participant. The FB-MM may continuously or intermittently transmit complete or partial information pertaining to the match by any known transmission system, for example, a wired transmission system or a wireless transmission system.

A FB-MM may transmit to other FB-MM devices, to any Smartphones, Tablets, or any instrument or device that can receive a signal, using the FB-MM application, and/or to a web site the information may be seen heard and activated on the internet, or posted to boards or screens located in or out the match venue, and for radio and/or television broadcast.

The FB-MM can transmit all or any chosen data information within the system that is used by the referee or by other authorized personal at any chosen time to show data, for example, team players, match time status, scoring result, yellow/red card warnings, stoppage time, additive time, substitutions, penalty kick, match report, and any data chosen, to authorized or unauthorized recipients, on request, in and out the stadium. Such recipients may include other referees and officials, team stuff, press and broadcasters, spectators and anyone interested any place on the world and in space.

By transmitting to spectators online and the ability of spectators to receive the data by common devices such as smartphones and tablets for instance, the FB-MM system creates, by using an appropriate applications for the Smartphones or Tablets or any receiving device, the ability to receive and trace, all the match data online, from all the matches played single or simultaneously, played at any place on earth.

The transmitting/receiving status indicator 6 may indicate the intensity of the signal of live receiving distance and quality, of any data information transmitted to the FB-MM system by authorized people, for example, others referees, for the purpose of updating the team players, players substitution, or to draw attention of the referee to any event accrued that was from the referee, before, during, and after the game, as well as to remind the user to activate some functions in the FB-MM.

The FB-MM can receive signals and data from any compatible electronic, optical, or/and computerized device and/or system and used as part of authorized aids for the referee or the referees in the future, for example, a disputed goal ruling, or reviewing whether foul occurred within the 16 meter zone. All signal transport to and from the FB-MM may be encrypted and secured from unauthorized penetration by appropriate protection method familiar to persons having ordinary skill in the art.

Figure 20:
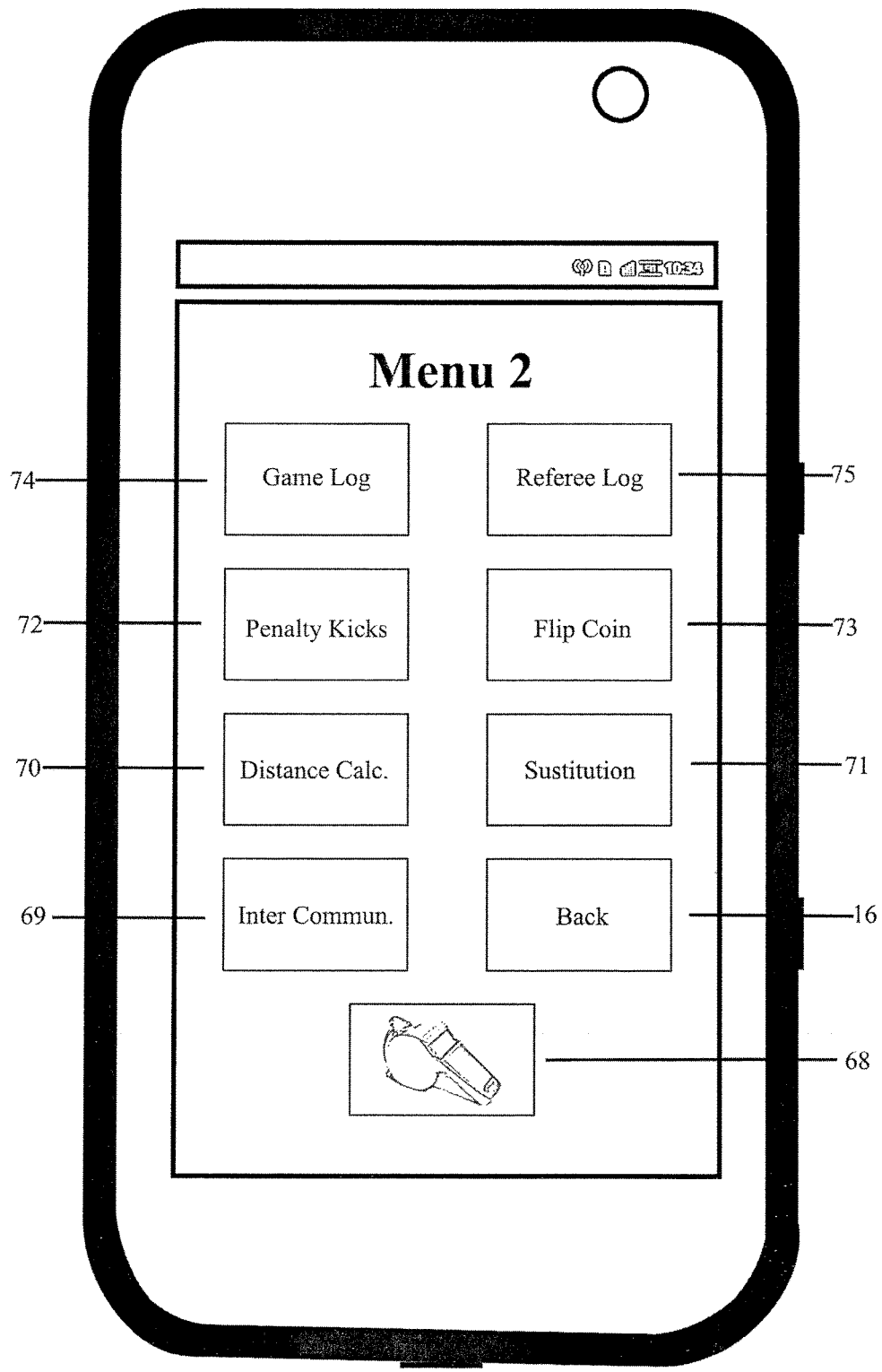
FIG. 20 is a schematic diagram of a menu 2 screen.

A real time indicator 7 shows the real time as a clock to indicate the actual time for reference and is programmed to participate as time indicator in the final report information as seen and explained below in the description of the report 71 (FIG. 20).

A power indicator 8 indicates the level of power supplied by a power supply, for example, a battery another power supply. The user may refer to the power indicator 8 to ensure there is adequate power available to use the FB-MM for conducting a full match with safe time margins for any activities before during and after the match. If low power or insufficient safe margins power level are detected, the FB-MM will generate an alarm, for example using sound, vibration, displayed text or colored screen, or combination. In case of certain insufficient power level the FB-MM may shut itself down prevent accidental unnecessary use.

A distance measuring sensor 9 is used to measure a fixed distance, for example but not limited to, in the range of 10 yards to 9.15 meters, according to the current allowed distance between the ball and the defending players in a free kick situation. The measuring system may use a laser or ultrasonic or optical system, chosen and decided by the governing organization, for example, the IFAB/FIFA. The FB-MM may be programmed to measure other distances on demand, as described below (see FIG. 20 and the discussion below of the Menu 2 screen, distance calc.).

A data transmitting/receiving socket 10 is a connector providing wired communications access to the FB-MM system for transmitting and receiving, downloading and uploading data to and from the FB-MM to/from any outer device, for example, disk on key, camera card, tablet, cell phone, computers, and another FB-MM. The socket 10 may be used for transmitting to any receivers in and out the stadium, for example, loading the team players to the FB-MM for a specific match, or uploading/downloading the match report by the referee.

Configuring the FB-MM System Before a Match

Figure 2:
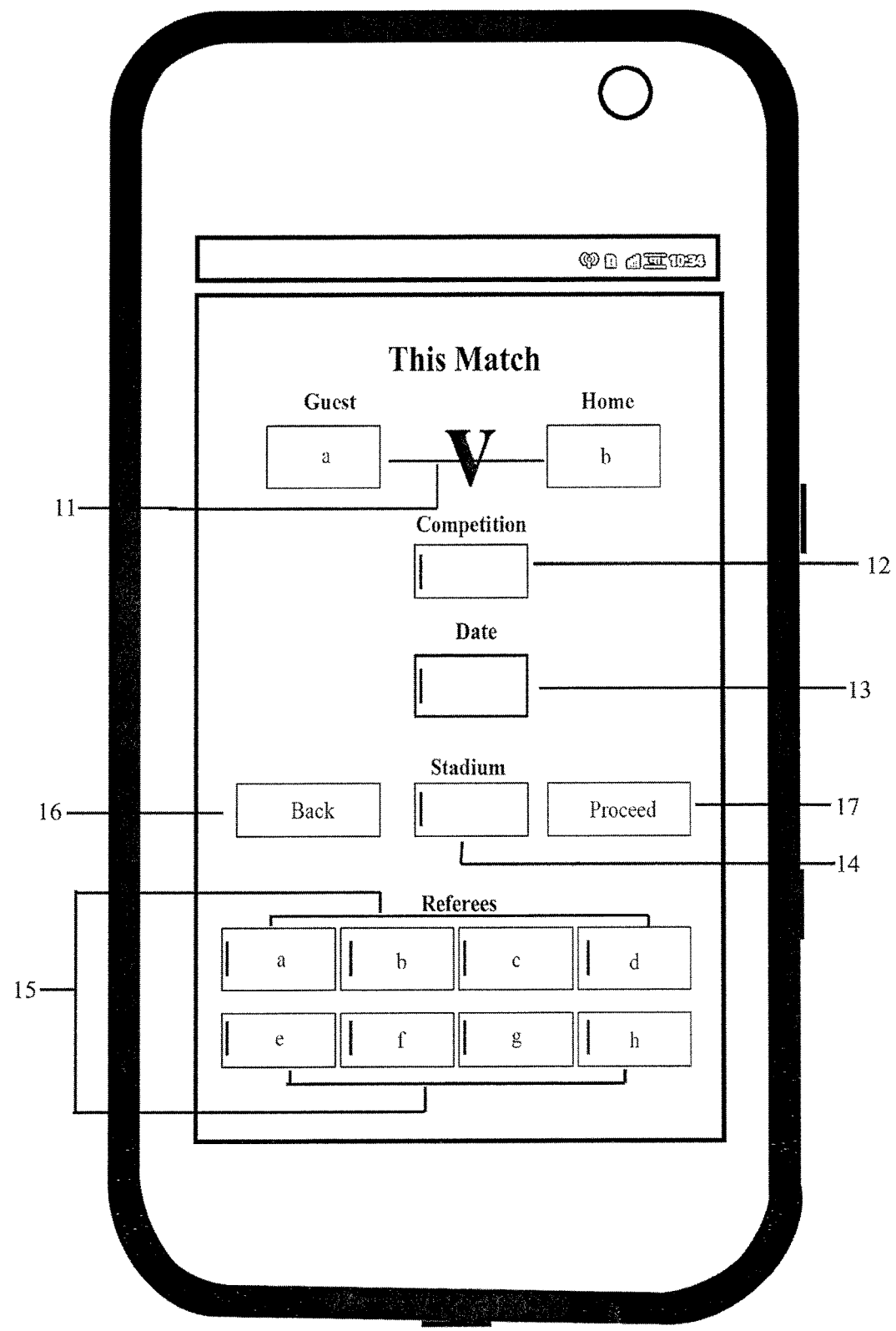
FIG. 2 is a schematic diagram of a basic match data screen.

FIG. 2 shows the basic match data screen. The FB-MM system basic data screen is the hierarchically the highest level screen. When the system basic data screen is displayed data may be loaded by the referee or any authorized personal before the game starts. This data is generally related by the FB-MM program using the Game Log 71 and Referee Log 75 (FIG. 20). A guest textbox 11a, and a home textbox 11b indicate the name of each team competing in the match. A competition textbox 12 refers to the type of competition for the match, for example, a league round number or cup number, such as quarterfinal, semifinal, final, etc. A date textbox 13 indicates the date of the match. A stadium textbox 14 is used to enter/indicate the stadium name and place. In addition, a country name may be added for international matches, for example, Camp Nou Barcelona, Spain, or Wembley London, England. Eight referee textboxes 15 are used to refer to the names of the referees conducting the match. The first row of referee textboxes 15a, 15b, 15c, and 15d, refer to the referees according to the common today four referees system, for example a chief referee, two lineman referees and a fourth referee. The second row of referee textboxes 15e, 15f, 15g, and 15h may optionally be used to refer to additional referees and/or match officials. For example, the European Football Association UEFA is considering "16 meter zone", two extra referees with the four standard referees. A back indicator button 16 may be used to change screen to former screen. Similarly, a proceed indicator button 17 may be used to proceed to the next screen. The indicator buttons 16/17 may be actuated by touching the region of the touch screen 4a (FIG. 1) immediately above the indicator buttons 16/17.

Figure 3A:
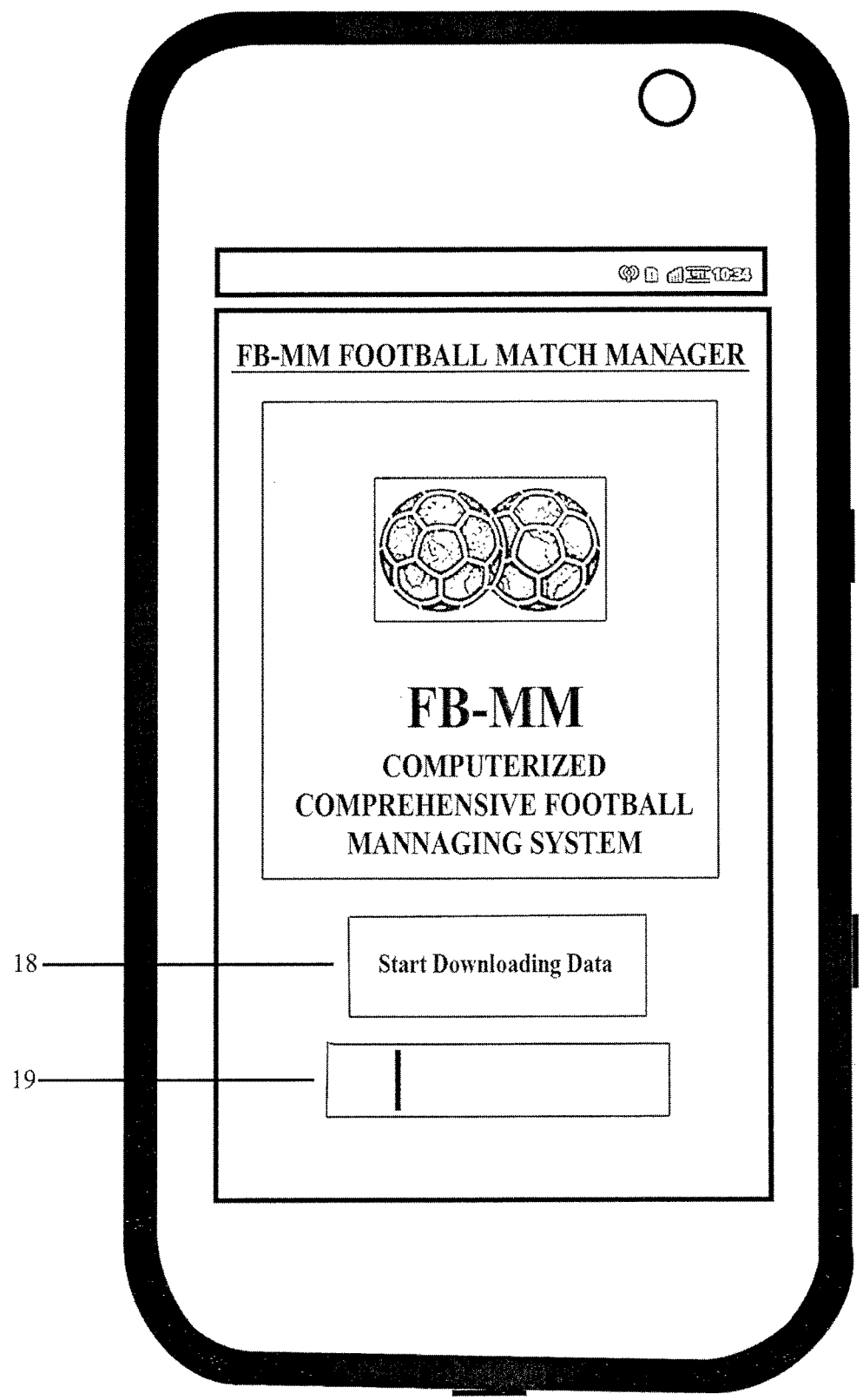
FIGS. 3A and 3B are schematic diagrams of a data downloading screen.
Figure 3B:

FIG. 3A shows a teams data downloading screen. The teams data downloading screen is used to download relevant personal data of players for the match. The data can be downloaded by means of physical contact via socket 10 (FIG. 1) from any computerized device or transmitted by wireless methods. The data includes the Home team players by numbers and by names; the team captains the coach or coaches, the substitution players by numbers and by names. That data will be supplied by an authorized personal of the teams or by any officials appointed to. This data will be used and programmed by the FB-MM system and placed in the right parts of the program. Depressing Start Downloading Data Indicator 18 on the screen starts to download the relevant data. The progress of the downloading is seen on progress bar 19. When downloading is completed successfully it will announce it by Download Data Completed Successfully, as shown by FIG. 3B, and will automatically progress the system to the next screen or select Back 16 if needed. In case of failure it will announce Download Data Failed, and new attempt is made.

Figure 4:
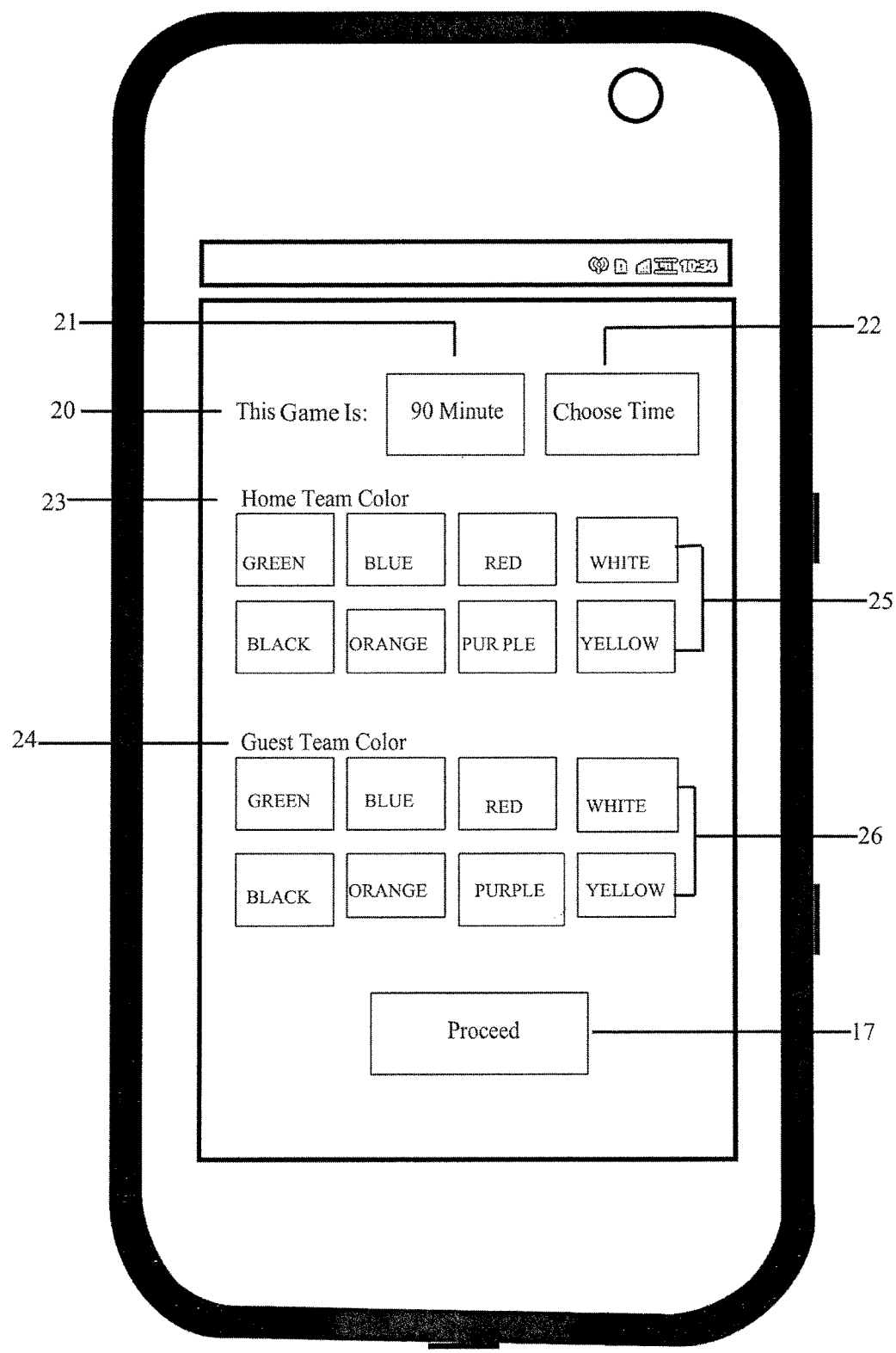
FIG. 4 is a schematic diagram of a game settings screen.

FIG. 4 shows a game settings screen. The text, "This game is" is a title indicator 20. The game indicator 20 indicates for the duration of the game. The type of the game chosen indicates whether it is a standard 90 minutes game, for example, a league game with no prolonging, or 120 minute game, for example, a cup game with prolonging option, an 80 minutes game for a youth game, or any other game time duration.

Figure 5:
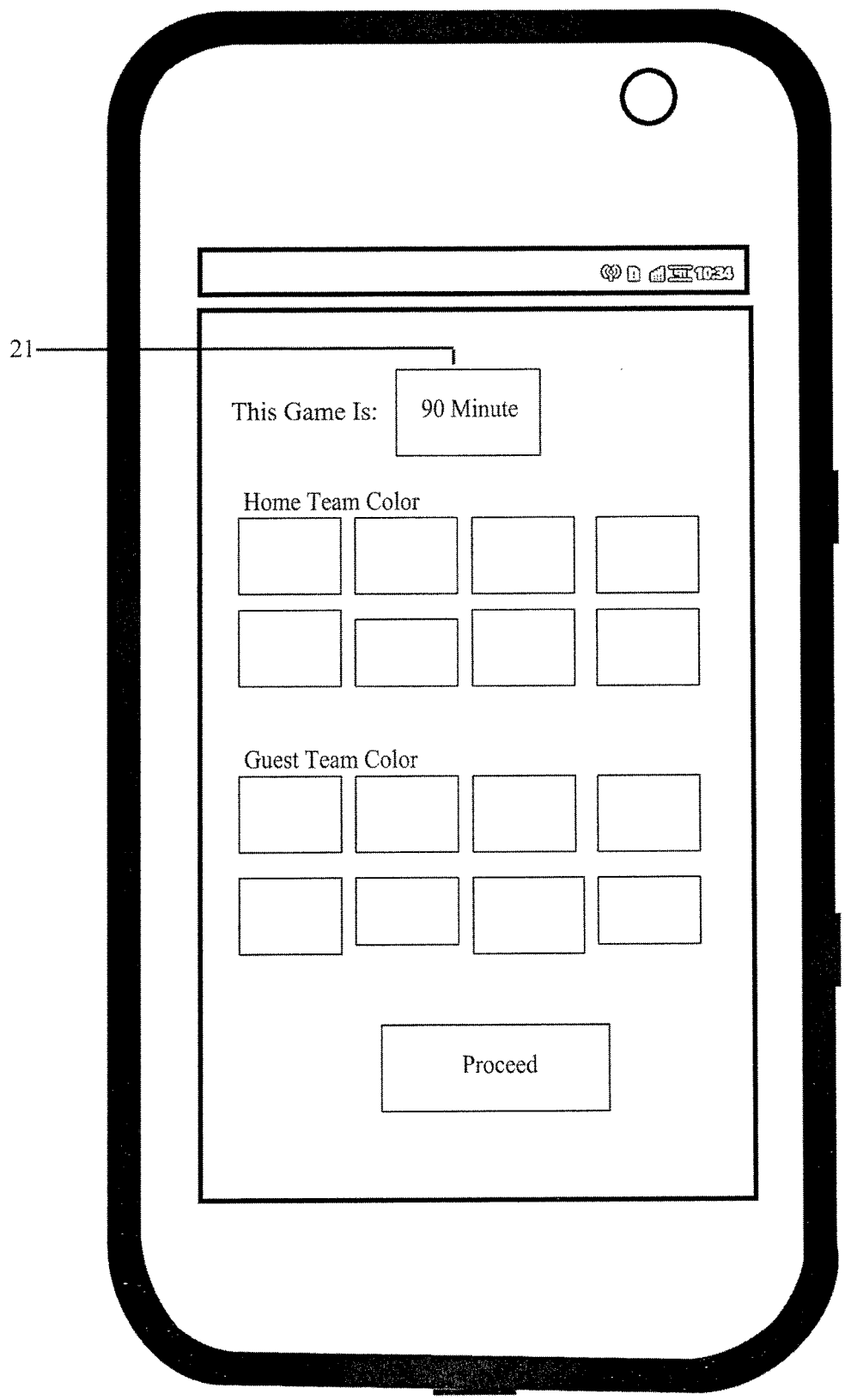
FIG. 5 is a schematic diagram of a 90 minute screen.

Since the most common game duration is 90 minutes, a 90 min, icon 21, is provided for convenience. When the 90 min. icon 21 is selected the match is scheduled for two 45 minute halves (excluding intermission and additive time), and the FB-MM system programs all the parameters for 2 halves of 45 minutes each. A clock counter (described below) will use the 45 minutes parameters and the referee will be notified accordingly. The additive stoppage time counter will have the ability to start counting automatically after each 45 minutes half. When 90 min. is chosen and selected the choose time Icon 22 is extinguished and only 90 min. shows, to indicate the game time duration, as shown by FIG. 5.

Figure 6:
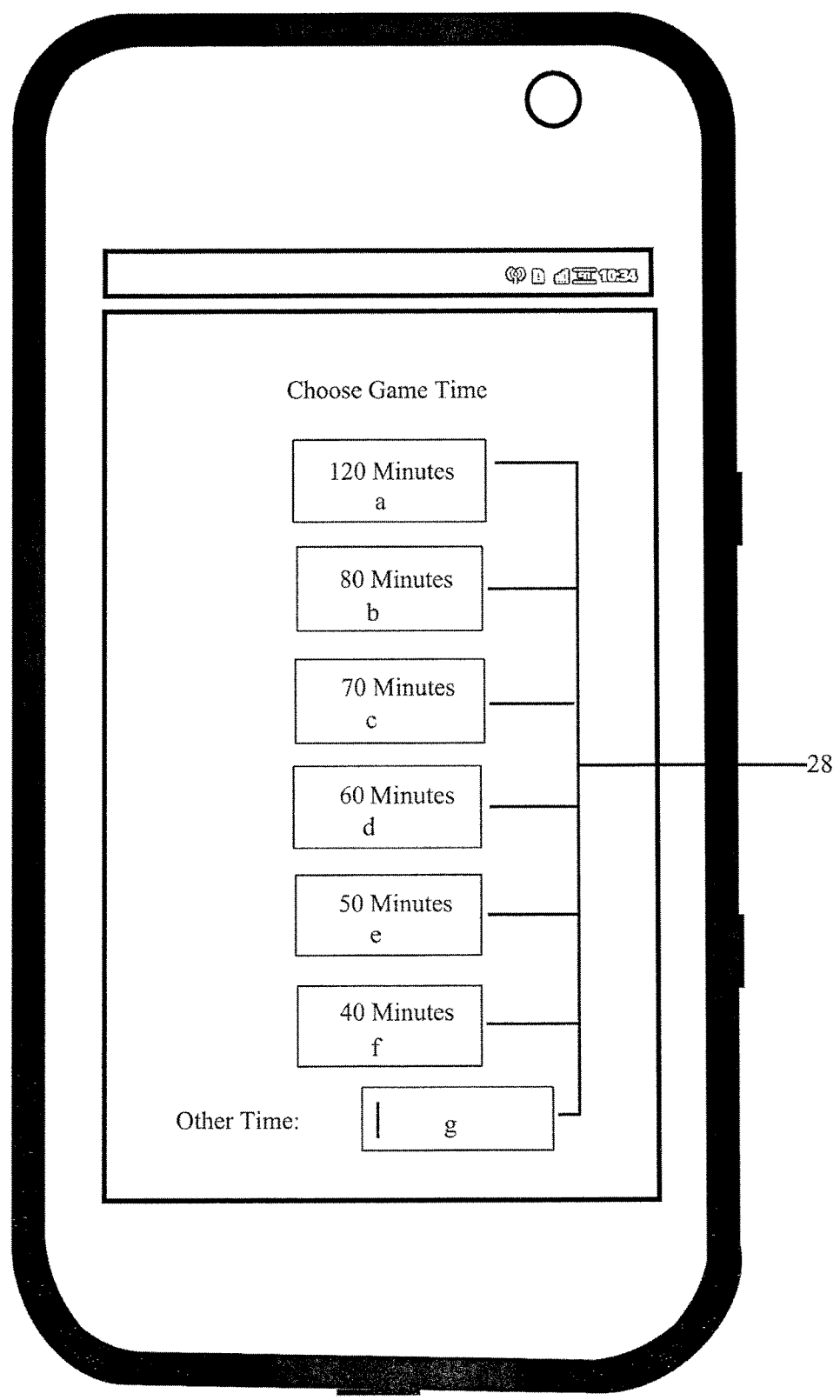
FIG. 6 is a schematic diagram of a choose time screen.

Returning to FIG. 4, for matches having a duration of other than 90 minutes, a choose time indicator 22 may be used to choose any other time duration of a game rather than 90 minutes game. Selecting the choose time indicator 22 opens a secondary time duration game screen, shown by FIG. 6. The secondary time duration game screen displays the text "Choose Game Time" above several selector boxes 28 to allow choosing different times such as 120 minutes game like a cup game 28a. By selecting the 120 minutes selector box 28a, a 120 minute game is chosen, thereby configuring a match having two halves of 45 minutes (excluding intermission and additive time), with an option of 2 halves of 15 minutes without additive time and break between the two halves if the score result is even after 90 minutes of playing game. In this case after 90 minutes, the FB-MM automatically activates the program to conduct the game with 2 halves of 15 minute with all the characteristics of 2 halves of 15 minutes as described in 90 minutes game.

Figure 7:
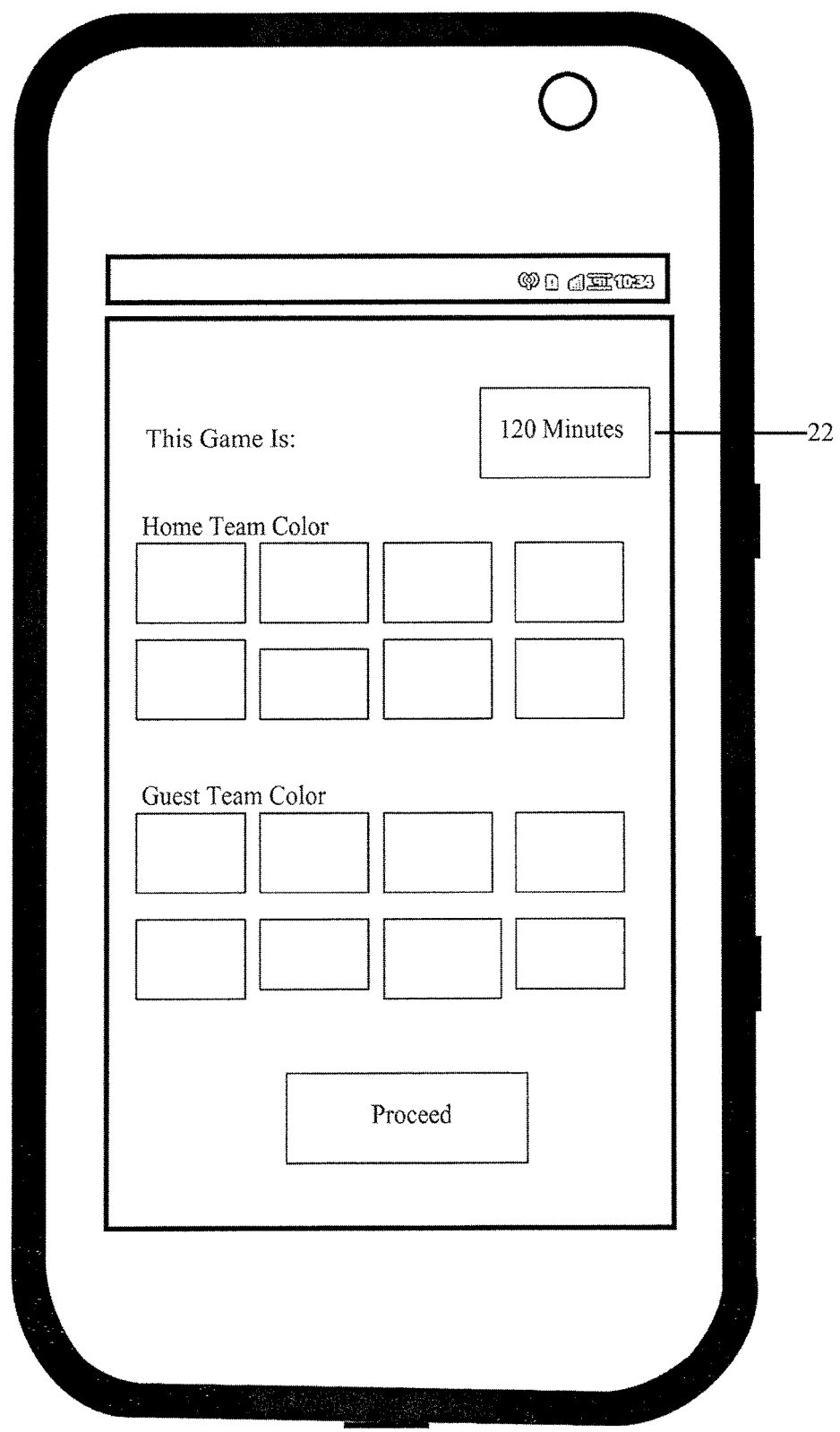
FIG. 7 is a schematic diagram of a 120 minute screen.

The remaining selector boxes 28*b*, 28*c*, 28*d*, 28*e*, and 28*f* allow the user to choose different type of games having a predetermined length and format, for example, kids, youth, senior or any agreed game duration time. The other time selector box 28*g* allows the user to define any game time manually for special occasions. All the chosen times, 28*b*, 28*c*, 28*d*, 28*e*, 28*f*, will automatically activate the FB-MM program to treat it as 2 halves of the times with all the characteristics as of 90 minutes game. When Choose Game Time selector 28*g* is selected, the 90 min. selector 21 is hidden and only the chosen time from secondary time duration game screen is displayed, indicating the game time duration chosen. For example, as shown by FIG. 7, a 120 minutes game is chosen.

Figure 8:
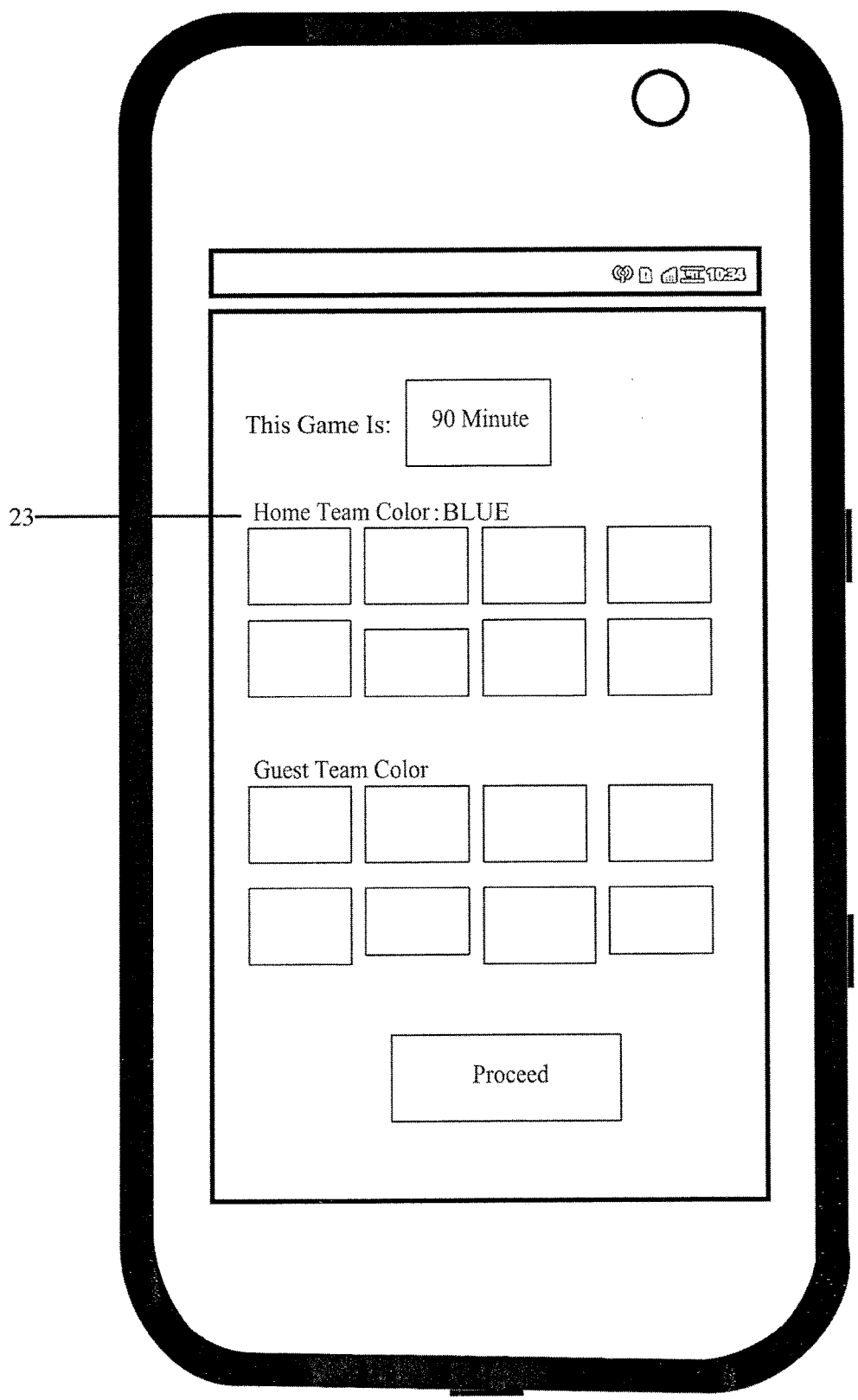
FIG. 8 is a schematic diagram of a home team identification screen.

After the game duration is selected, a screen appears to allow the user to identify the home and guest teams. The home/guest teams may be designated in several ways. Under the first embodiment, the teams are designated by selecting a color for each team, for example, corresponding to the color uniform of each team. It should be noted that the FB-MM program may also/instead use a symbol or name or any chosen sign to identify and to relate all the events and data accrued, before, during, and after the game, in the programmed system. By choosing the team color uniform from a color palette 25, FIG. 4, the Home team may be identified by the same color Home of title or letters or symbol, 23 (FIG. 8). The selected color for each team may be used to signify information pertaining to the corresponding team in other screens throughout the FB-MM application. For example, the Home title 36 (FIG. 12) and the related digit of score result 35*b* (FIG. 12) and Home title of GOAL scoring symbol 46*b* (FIG. 12) may have the same chosen color to ease the referee and other users to follow the team on the FB-MM system and operate the FB-MM system quickly and accurately.

Figure 9:
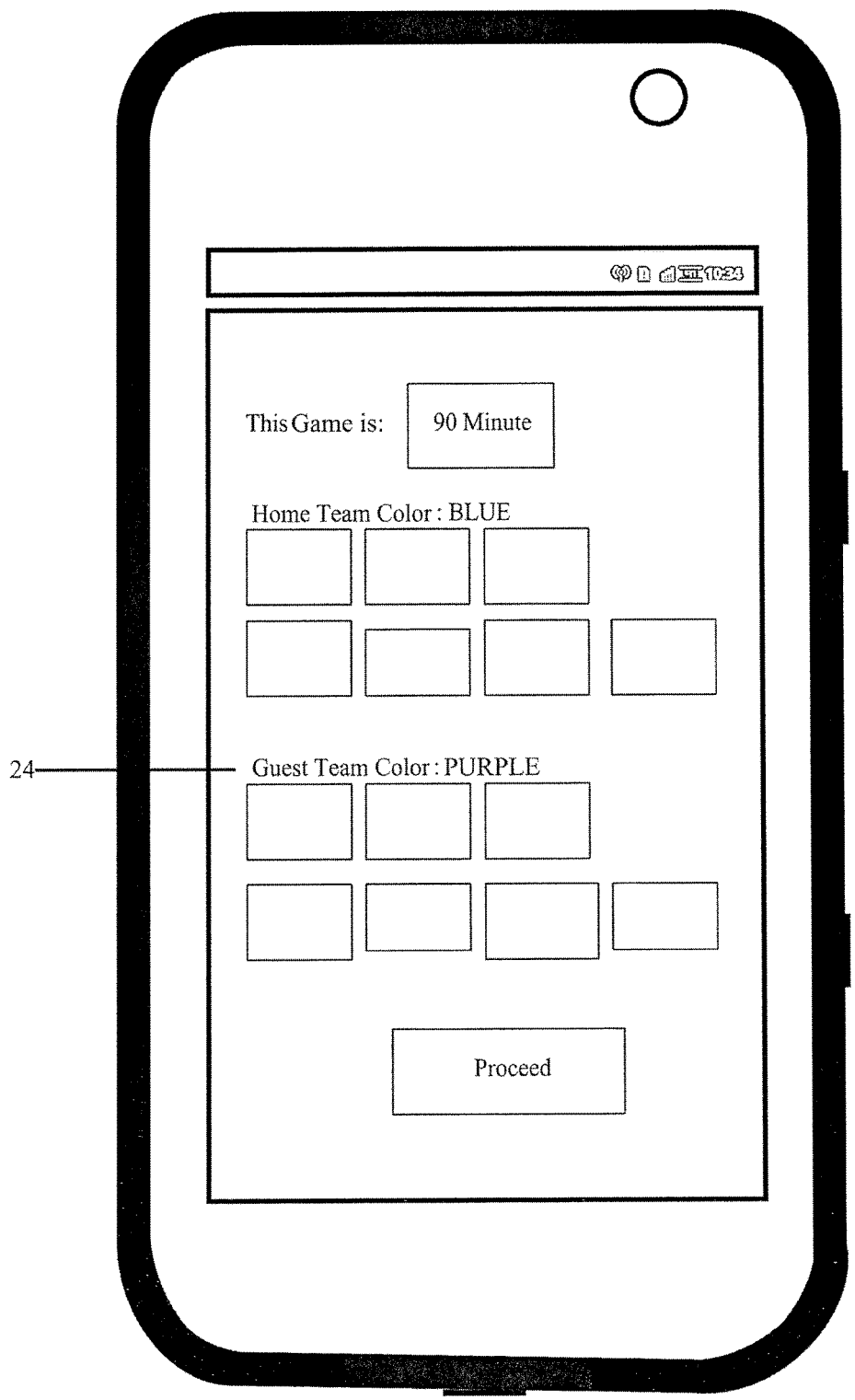
FIG. 9 is a schematic diagram of a guest team identification screen.

Turning to FIG. 9, the guest team color identification title 24 indicates a guest team uniform color palette 26, as shown in FIG. 4. As with the home team (above) the guest team may be identified by the same color of guest title letters of symbol 24. The guest title 37 (FIG. 12) and the related digit of score result 35*a* (FIG. 12) and guest title of GOAL scoring symbol 46*a* (FIG. 12) may have the same chosen with the guest team uniform color palette 26 FIG. 4. After configuring relevant time duration and teams identifications information for the game, selecting the proceed indicator 17, will advance the system and the screen to the flip coin phase.

Using the FB-MM During a Match

Figure 10:
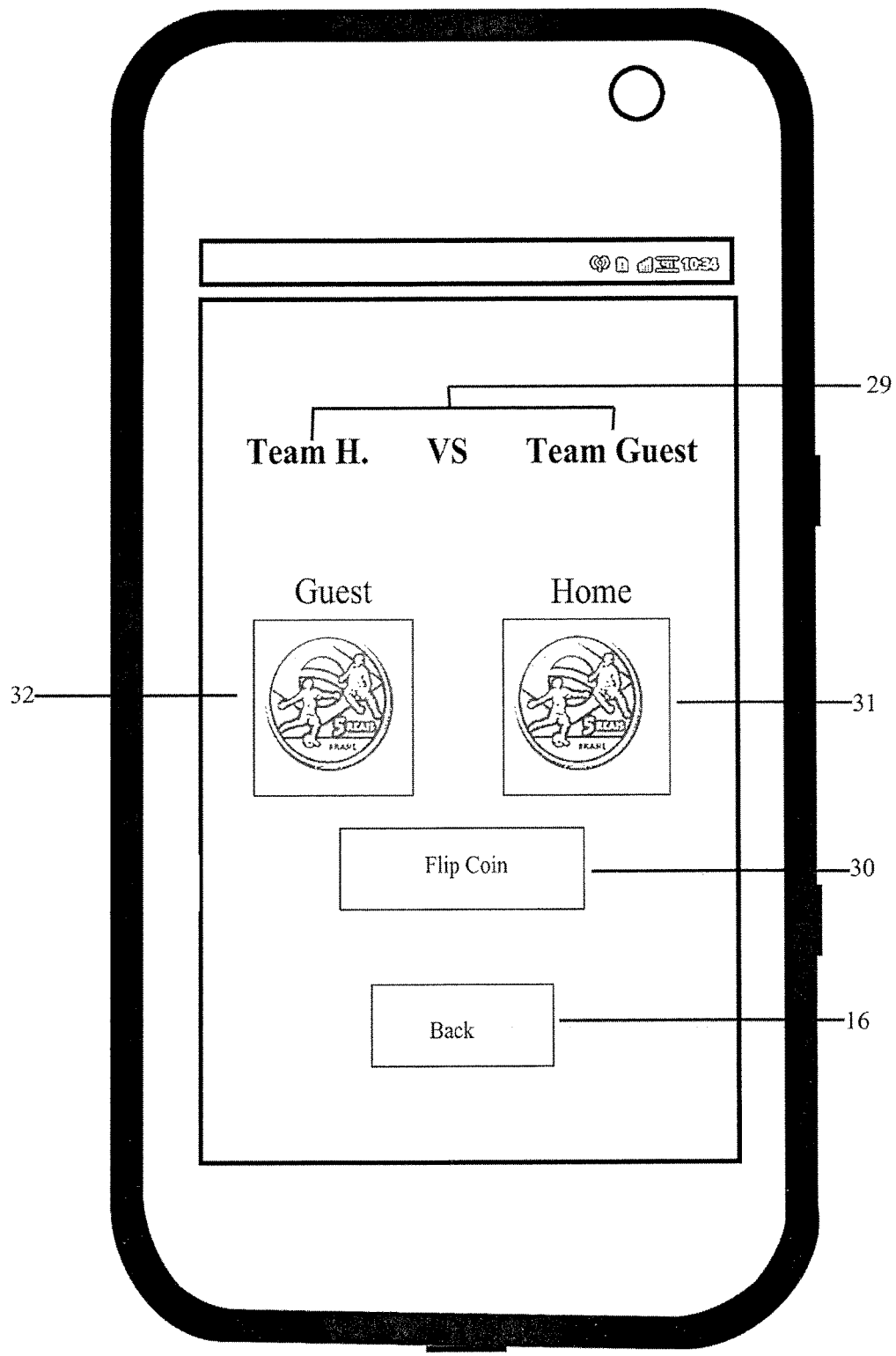
FIG. 10 is a schematic diagram of a flip coin screen.

FIG. 10 shows the flip coin screen. The flip coin title 29 shows the identifications of the teams participating in the match, as configured above. A flip coin icon 30 may be selected to initiate a routine to randomly select one of the two teams, simulating a coin flip. An exemplary routine to randomly select one of the two teams follows. However, there is no objection to using other random selection methods familiar to persons having ordinary skill in the art. The FB-MM system generates a random number between 8 (inclusive) to 20 (exclusive). If result of number divided by 2=0 then guest team is selected, otherwise the home is selected. This is to replace the traditional flip coin using a real coin by the referee, to draw the winning team, which has the priority to choose the side of the stadium or the ball to be the one that starts the game. The home team icon 31 represents the home team in the flip coin procedure. The guest team icon 32 represents guest team in the flip coin procedure. The back button 16 may be optionally selected to go back to the previous screen.

Figure 11:
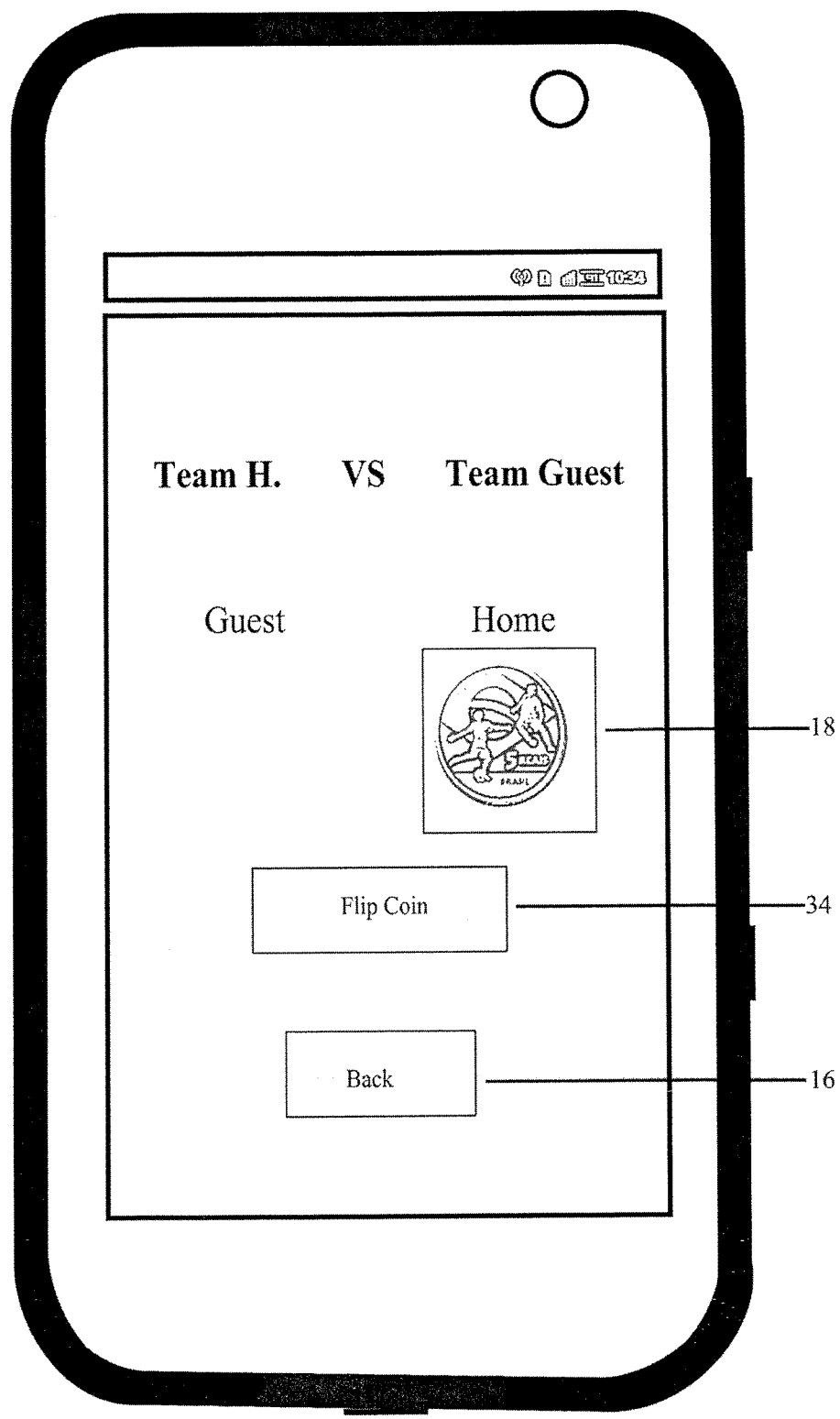
FIG. 11 is a schematic diagram of a flip coin result screen.

FIG. 11 shows the flip coin result screen. This screen displays the result of the FB-MM flip coin procedure. As a result of the procedure, the icon for the selected screen is displayed, and the icon for the team that was not selected is removed from the display. In the exemplary scenario shown by FIG. 11, the home team has won the coin flip. In a different scenario where the guest team is selected, the icon for the guest team would be displayed and the icon for the home team removed. A start game button 34 may be selected to proceed to the main screen FIG. 12 and starts conducting the game. As before, a back button 16 may be used to return to perform the flip coin procedure again if desired.

Figure 12:
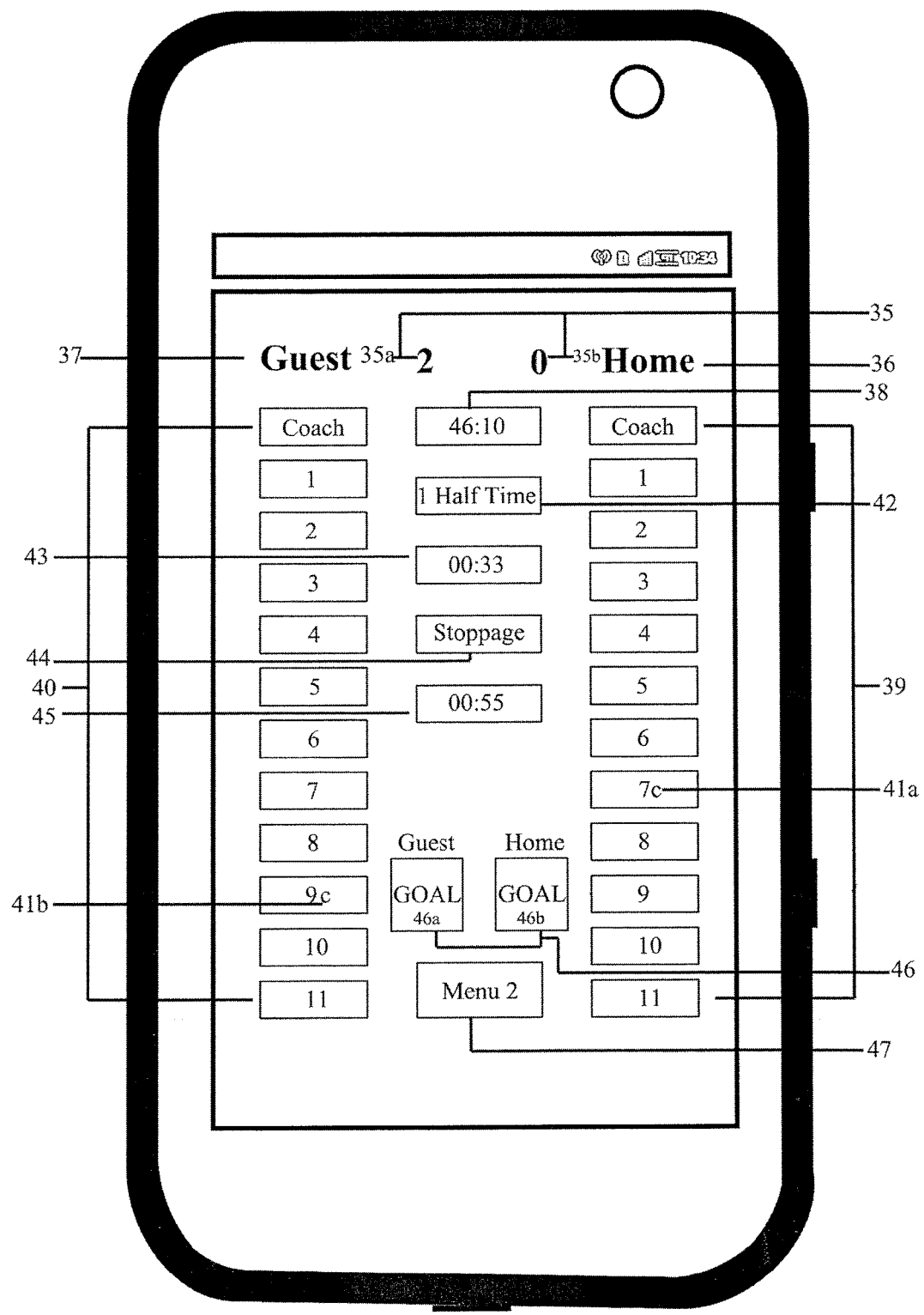
FIG. 12 is a schematic diagram of a game conducting screen.

FIG. 12 shows the game conducting screen. A goal scoring counter 35 presents the current match score for the home/guest teams. The home title 36 and home digits 35*b* may be presented in the selected color of the home team. Similarly, the guest title 37 and guest digits 35*a* may be presented in the selected color of the guest team. Selection of the home/guest team colors is described above.

A match clock counter 38 counts two halves of the total game time according to the type of game chosen. The match clock counter 38 indicates the match time played in minutes and seconds, counting forwards as according to the IFAB/FIFA regulations and is programmed as a default to notify the referee, for his convenience, the elapsed time of the game at 10 minutes intervals of time, for the first 40 minutes (in case of 90 minute game for instance) of each half and by intervals of every 1 minutes for the last five minutes. It may notify the user by sound, vibration, light, color. Alternatively, the time interval notification feature can be programmed to choose any preferred time interval, or may be disabled.

The HOME team players are represented by home team buttons 39 in a home column where the home team buttons 39 display a player number or the word "coach." The captain of the home team is demarked by the letter C displayed after the number in a home captain button 41. The GUEST team players are represented by guest team buttons 40 in a guest column where the guest team buttons 40 display a player number or the word "coach." The captain of the guest team is demarked by the letter C displayed after the number in a home captain button 41*a*. A status indicator 42 indicates the game status, for example, 1 Half Time, 2 Half Time, start 1Half, start 2 Half, End 1 Half, and End game.

A stoppage time counter 43 indicates accumulated stoppage time activated by a stoppage time indicator 44. The stoppage time indicator 44 activates the stoppage counter 43. This procedure may be performed repeatedly as needed, for example, for each stoppage of match play for a player injury. By selecting the stoppage time indicator 44 to start the stoppage counter, the title "Start Stoppage time" changes to "Stop Stoppage time". Selecting the stoppage time indicator 44 again stops the counter 43, and the title "Start Stoppage time" reappears, indicating the counter is ready for a new stoppage time procedure. All accumulated stoppage time can be seen all the time during the game on the stoppage time counter 43.

At the end of each half of a match, an additive counter 45 starts automatically or by referee decision to count down all the accumulated stoppage time, in addition to the time spent during the half time game. The additive counter 45 may notify the referee by sound, vibration, light, of pre-programmed time before starting to activate the counter to give the referee the alert.

A home/guest goal recording indicator 46 may be used to record goals scored by either team. Selecting the home team goal recording 46a during the game indicates the home team has scored a goal. Selecting the guest goal recording indicator 46b during the game indicates the guest team has scored a goal. The team titles of the home/guest goal recording indicator 46 may be represented in the appropriate team colors chosen previously. Selecting the home team goal recording indicator 46b or guest team goal recording indicator 46a records a goal for the scoring team and are resulting score is presented at the goal scoring counter 35 with appropriate team chosen color digit. A menu 2 icon 47 may be selected to proceed to a Menu 2 screen.

Figure 13B:
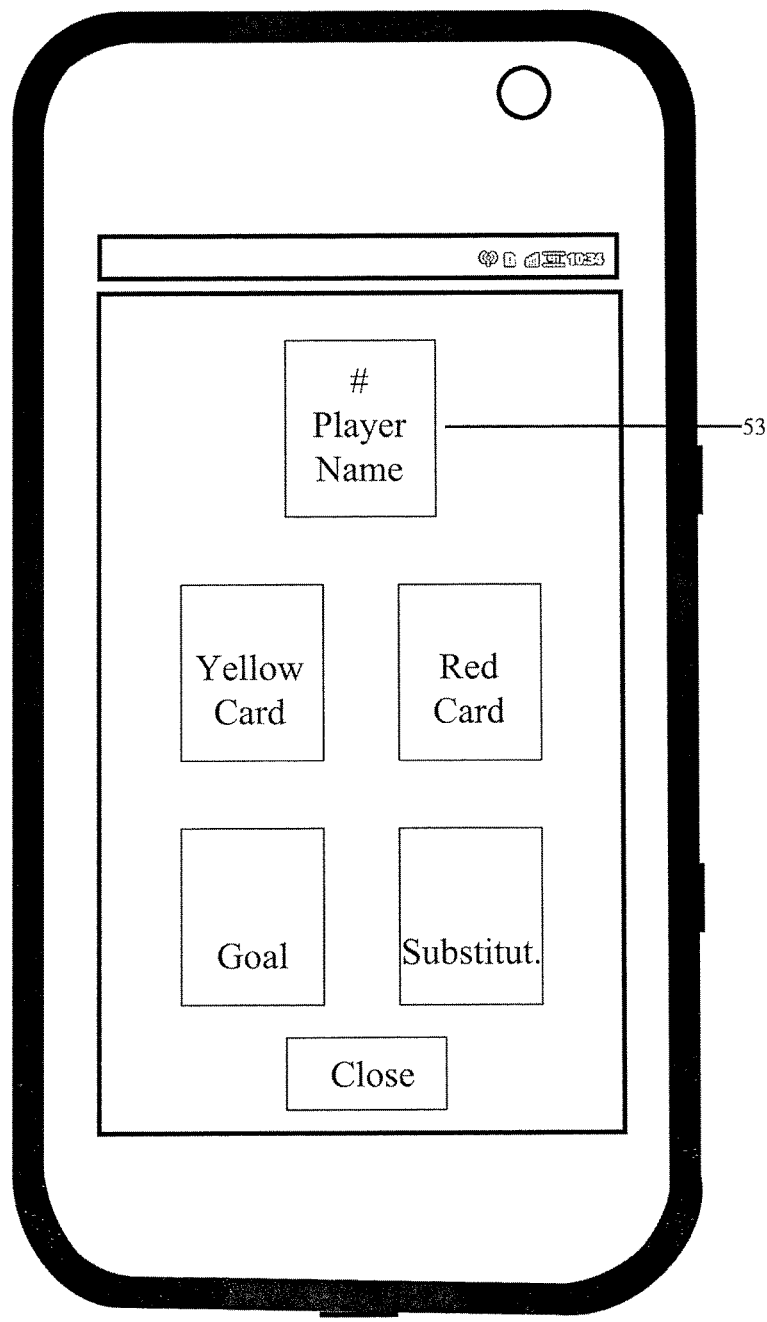
FIG. 13B is a schematic diagram of an expanded activity chooser screen.

FIG. 13A shows an activity chooser screen, and FIG. 13B shows an expanded activity chooser screen. Selecting a player number icon on team players columns 39, 40 (FIG. 12) opens the activity chooser screen. When the activity chooser screen is displayed, the user may indicate that the corresponding player is to be given a yellow card or red card warning, or to record a goal scored by the player or indicate the player is to be substituted. By selecting a player number icon on team players columns 39, 40 (FIG. 12) with a "double click" or similar operation, an expanded activity chooser screen is displayed instead of the activity chooser screen, as shown by FIG. 13B. The expanded activity chooser screen includes substantially the same characteristics as screen the activity chooser screen (FIG. 13A), additionally displaying a player photo 83 corresponding to the selected player. Selecting the photo 53 may open a file associated with the player containing relevant details and statistics of his sportive activity. Either the activity chooser screen (FIG. 13A) or the expanded activity chooser screen (FIG. 13B), may be configured by the user as the default screen displayed when a player button 39, 40 (FIG. 12) is selected.

A yellow card icon 48 may be selected for a yellow card warning procedure (described below) for a player or players or coach or any official personal related to the teams. Similarly, a red card icon 49 is used in a red card warning procedure (described below) for player or players or coach or any official personal related to the teams. A goal icon 50 is used to record goals scored by selected player. A substitution icon 51 is used for substitution procedure. A close icon 52 allows the user to close the activity user screen manually and return to the game conducting screen (FIG. 12).

Figure 14:
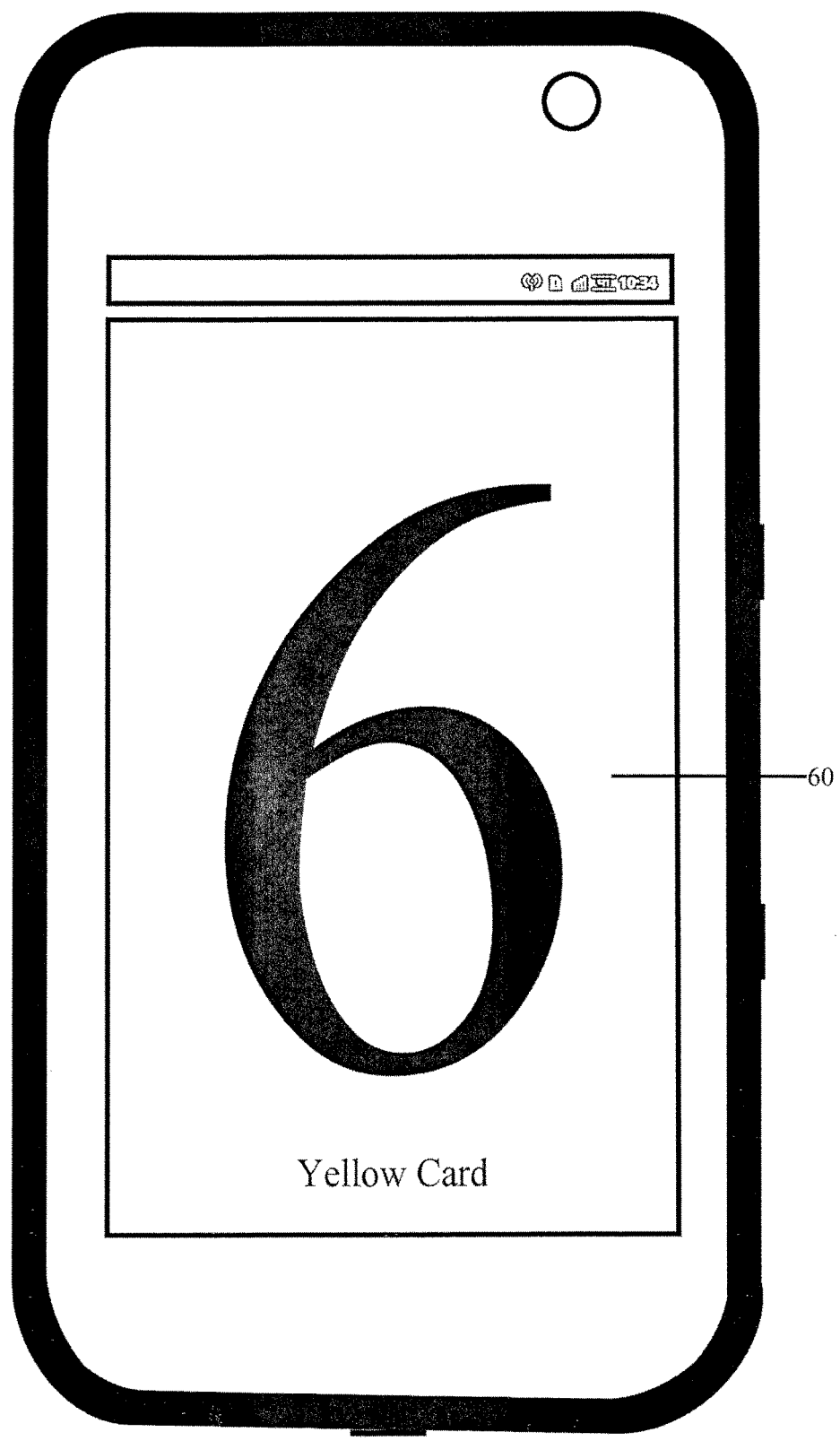
FIG. 14 is a schematic diagram of a yellow card screen.

FIG. 14 shows a yellow card screen. The yellow card warning screen 60 displays the number of the player receiving a yellow card warning. The entirety of the front and rear screens 4a, 4b is displayed in the color yellow with number of the player colored in black in middle of screen to identify the player being warned to visually alert players and match spectators of the warning.

Figure 15:
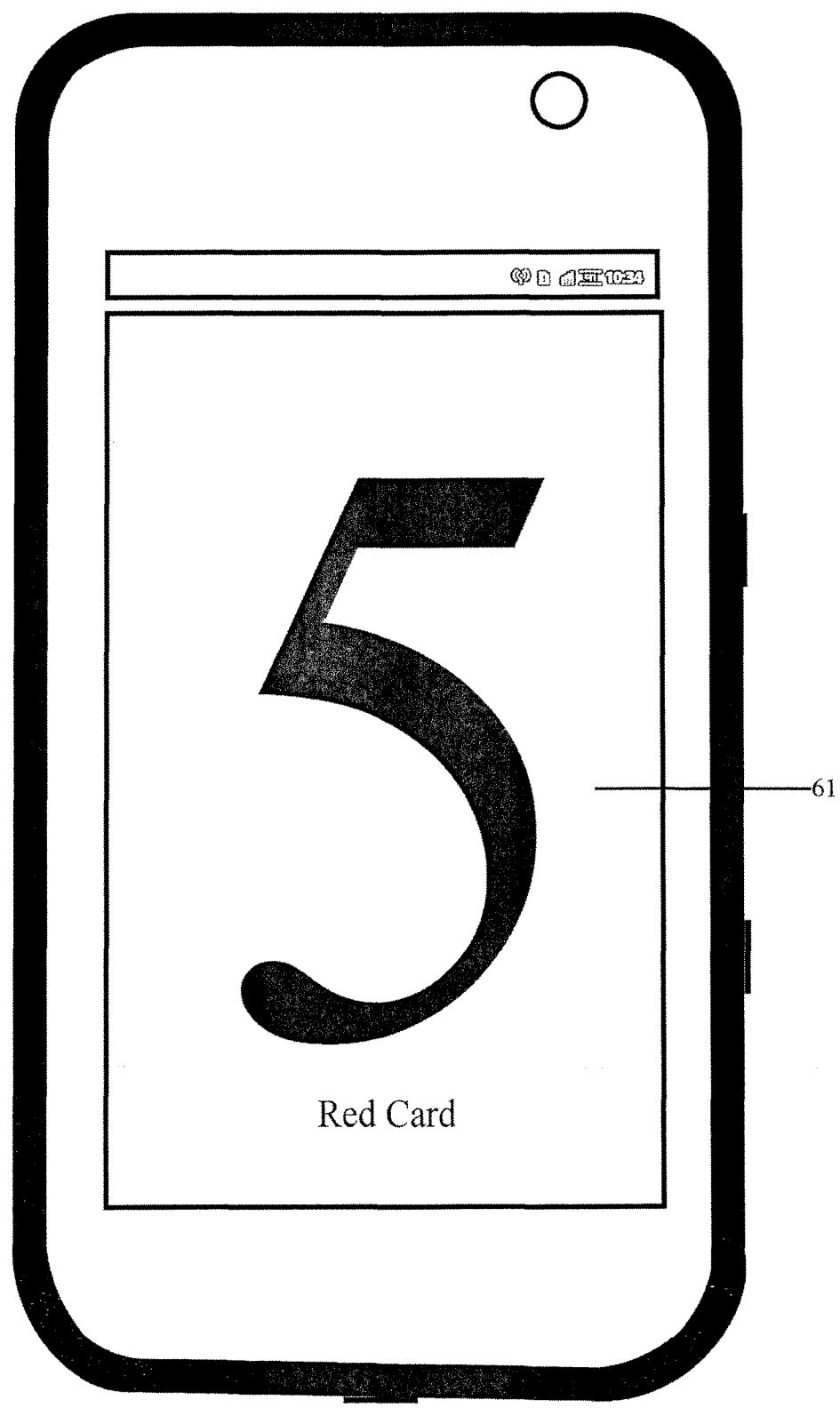
FIG. 15 is a schematic diagram of a red card screen.

FIG. 15 shows a red card screen. The red card warning screen 61 displays the number of the player receiving a red card warning. The entirety of the front and rear screens 4a, 4b is displayed in the color red with number of the player colored in black in middle of screens 4a, 4b to identify the player being warned to visually alert players and match spectators of the warning.

Figure 16:
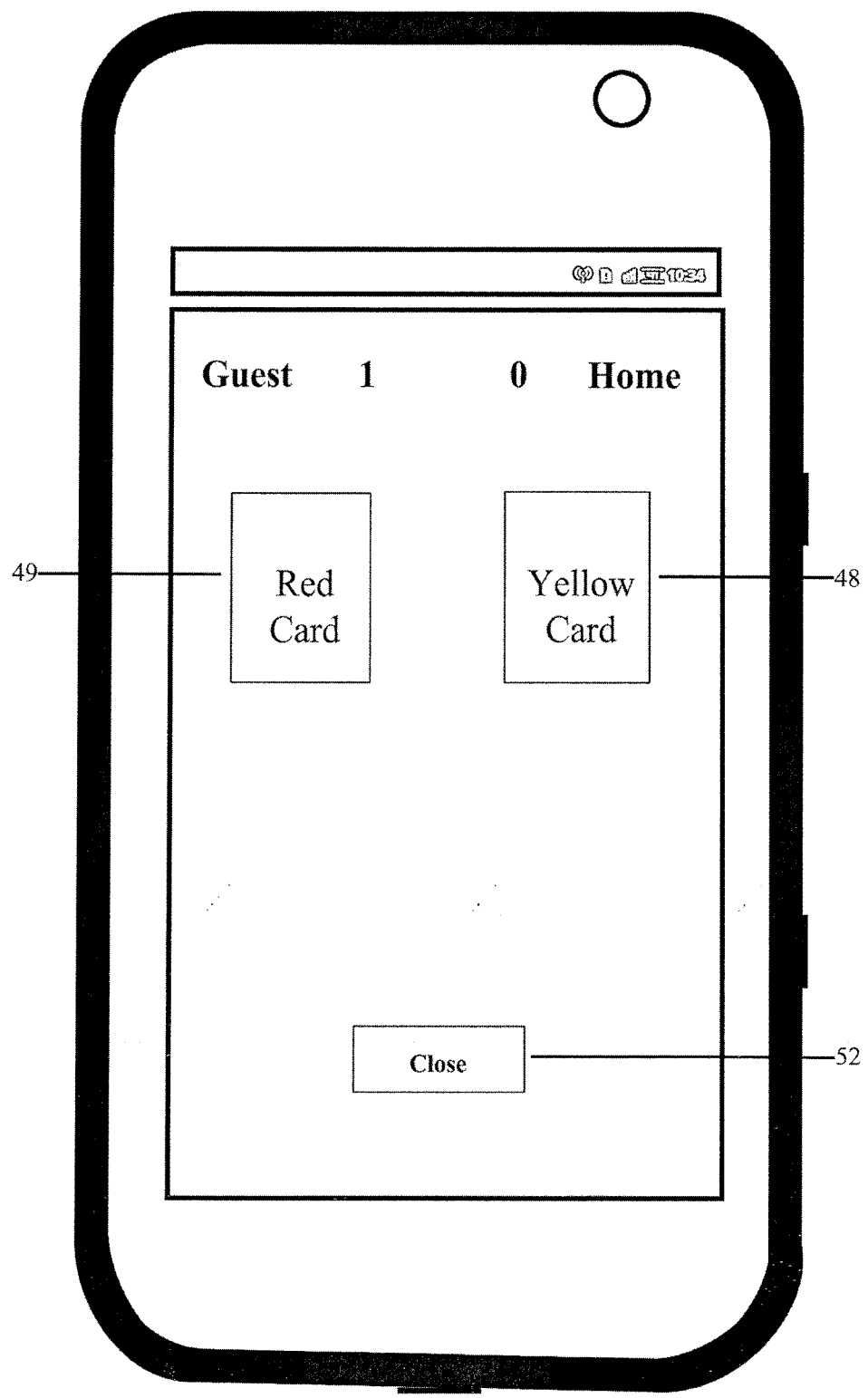
FIG. 16 is a schematic diagram of a card chooser screen.

FIG. 16 shows a secondary yellow/red card warning screen. A yellow card icon 48 and a red card icon 49 choose auxiliary warning screens pertaining to others individuals who may be warned beside players, for example, a coach. The auxiliary warning screens may be used for warning guest or home team coaches. Selecting the coach icons 39, 40 (FIG. 12) opens the secondary yellow/red card warning screen FIG. 16 allowing the user to choose a yellow card or red card warning to the home or guest coach, or other personal to be warned with a blank yellow screen or a blank red color screens.

Figure 17:
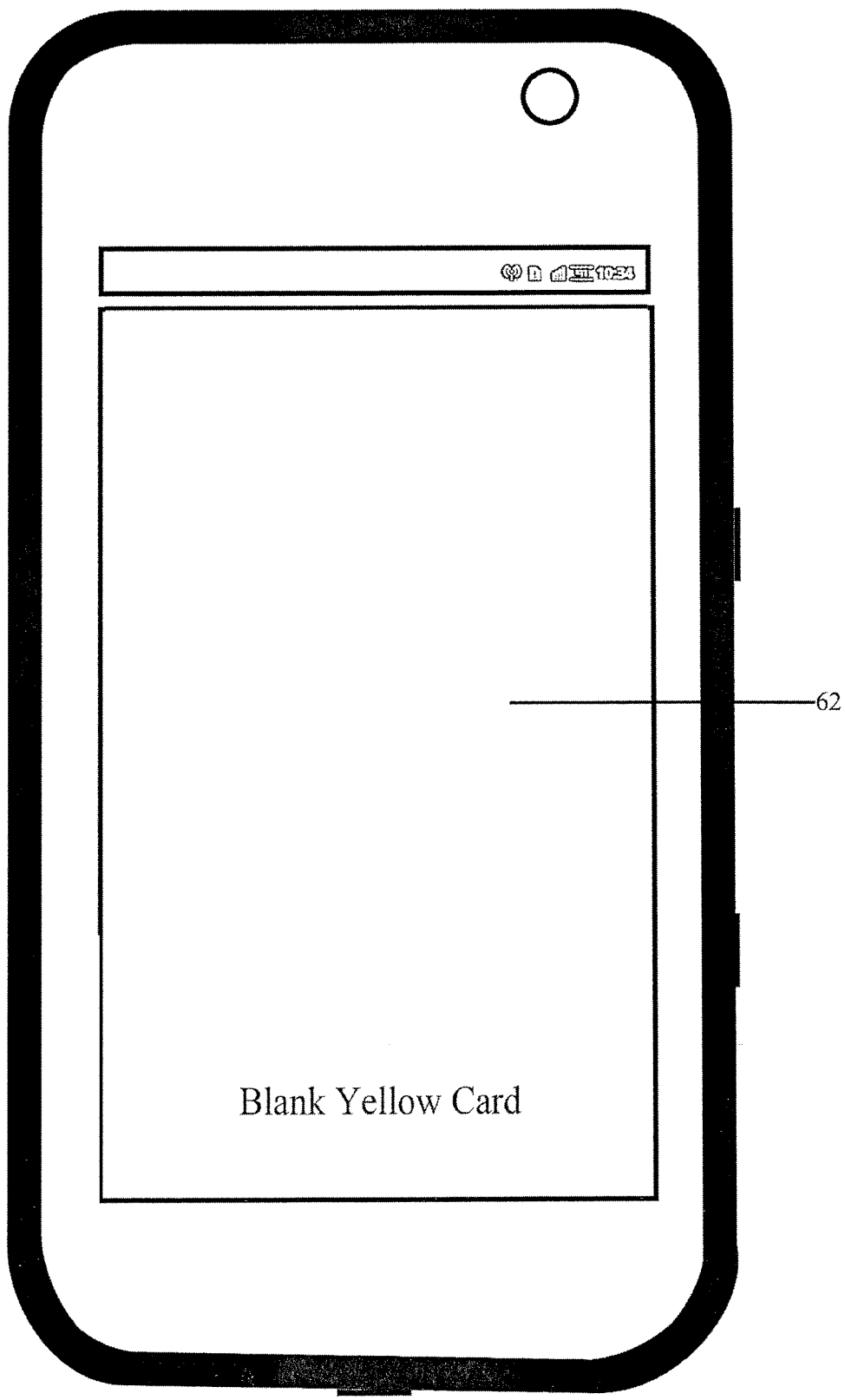
FIG. 17 is a schematic diagram of a blank yellow card screen.

FIG. 17 shows the blank yellow card screen. The blank yellow card screen 62 may be used to warn non players. The front and rear screens 4a, 4b turn yellow with no number to warn a non numbered personal participating in the game, allowing allow all viewers to be informed to this action.

Figure 18:
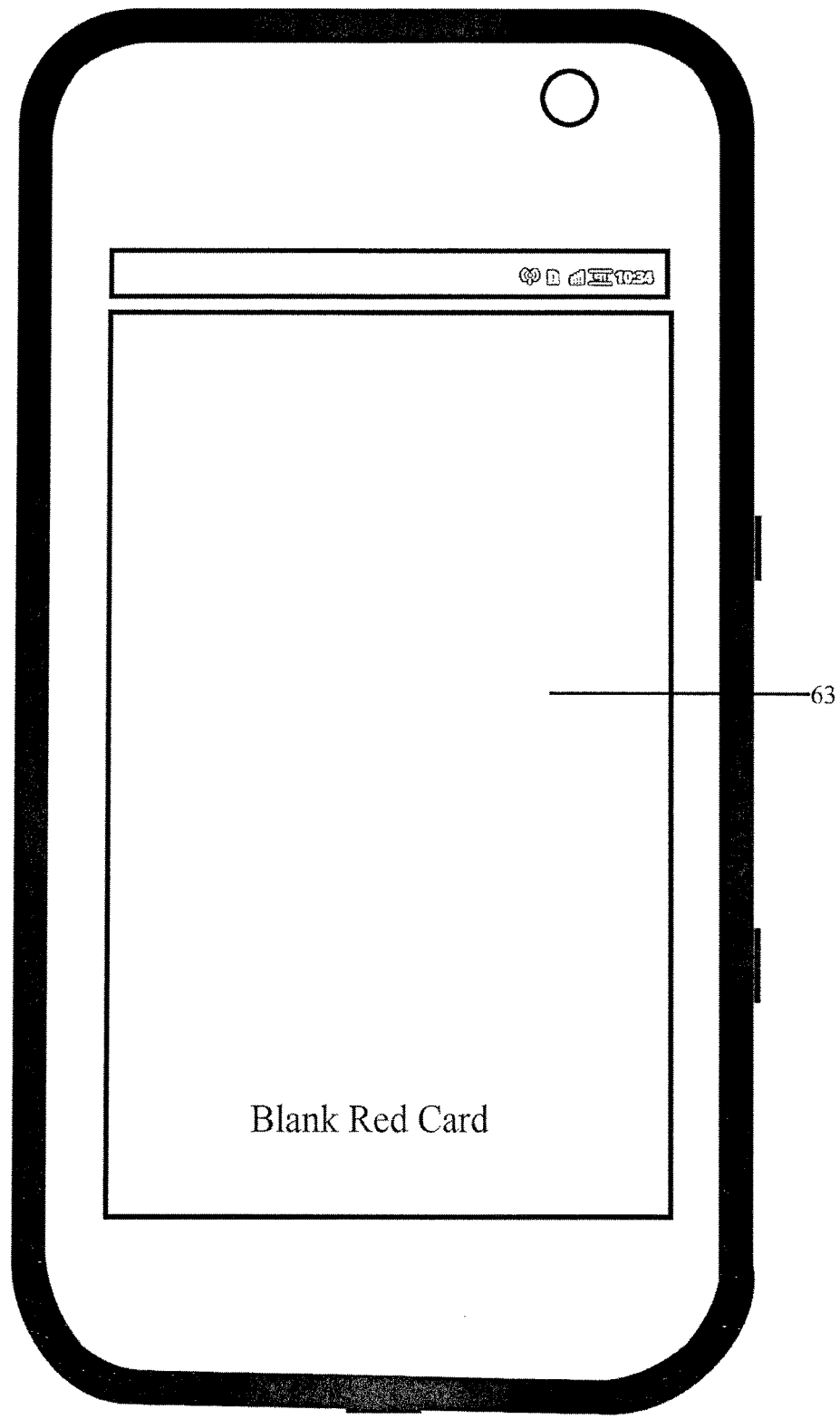
FIG. 18 is a schematic diagram of a blank red card screen.

FIG. 18 shows the blank red card screen. The blank red card screen 63 may be used to warn non players. The front and rear screens 4a, 4b turn red with no number to warn a non numbered personal participating in the game, allowing allow all viewers to be informed to this action.

Figure 19:
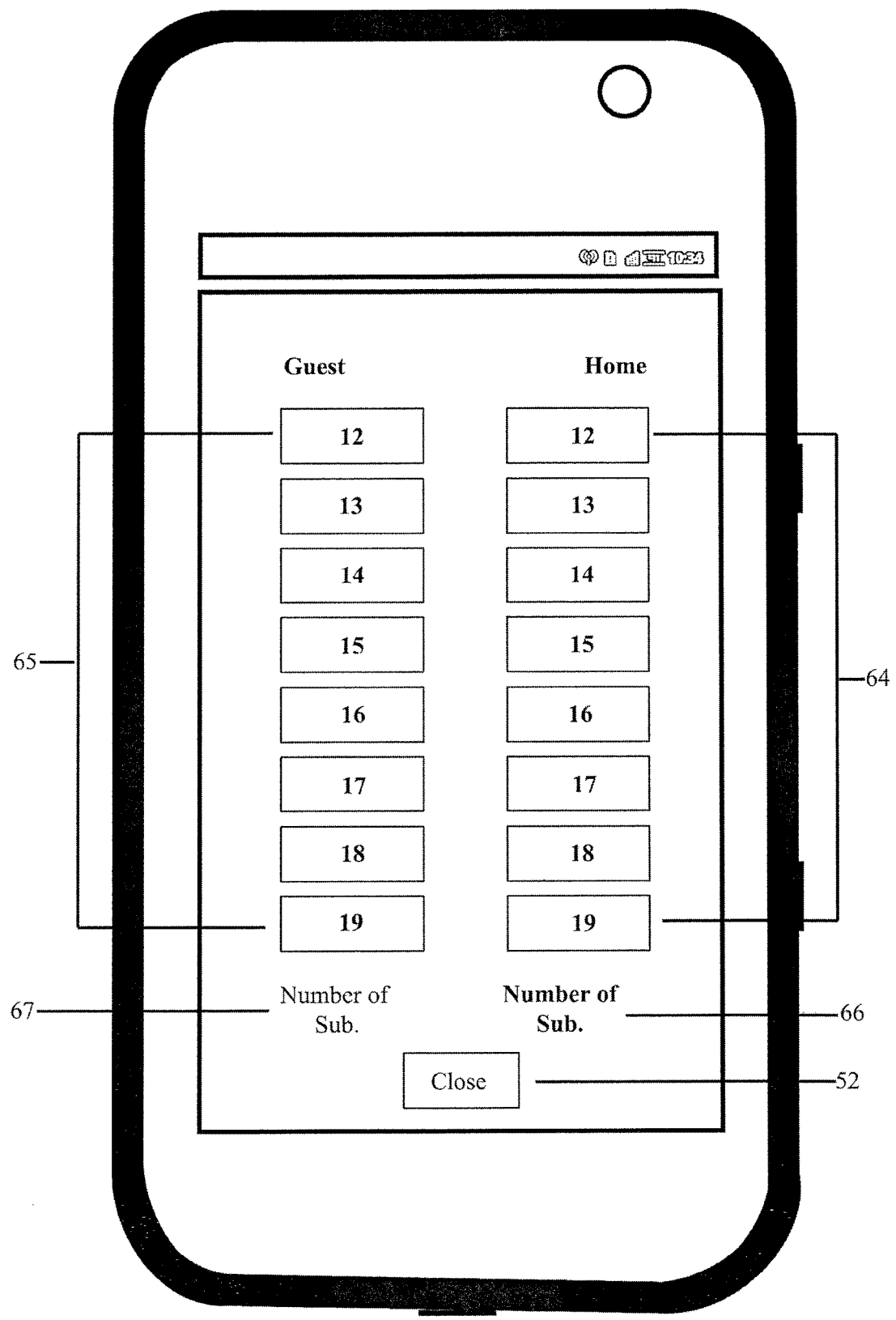
FIG. 19 is a schematic diagram of a substitution screen.

FIG. 19 shows a substitution screen. The substitution screen may be reached by selecting the number of a player to be substituted out of the game. This activates the substitution procedure. The substitution screen may similarly be reached by selecting the substitution icon 73 on menu 2 (FIG. 20) to read and to observe a substitution situation. A home team players column 64 displays player buttons representing the players on the home team that may be substituted to replace any chosen active home team player. This list represents all the players that are available to be substituted for active players. A number of home subs. title 66 indicates the number of players already substituted by the home team. The number of substitution during a game for each team is limited. A guest team players column 65 displays player buttons representing the players on the guest team that may be substituted to replace any chosen active guest team player. This list represents all the guest team players that are available to be substituted for active players. A number of guest subs. title 67 indicates the number of players already substituted by the home team.

FIG. 20 shows the menu 2 screen. The menu 2 screen provides access to screens performing functions that are used before during or after the game or may be regularly or routinely used for conducting a match in progress. A whistle icon 68 selects a recording whistles function used for data and analysis of the amount and frequency of whistles blown by the referee during a game. It may use any Bluetooth transmitting receiving device that can create a whistle sound and to sends signals via Bluetooth to a FB-MM whistle program, every time it is used to create a whistle sound. The whistle program may record all the whistles made during the game indicating with the minute of the game when each whistle was blown.

Figure 26:
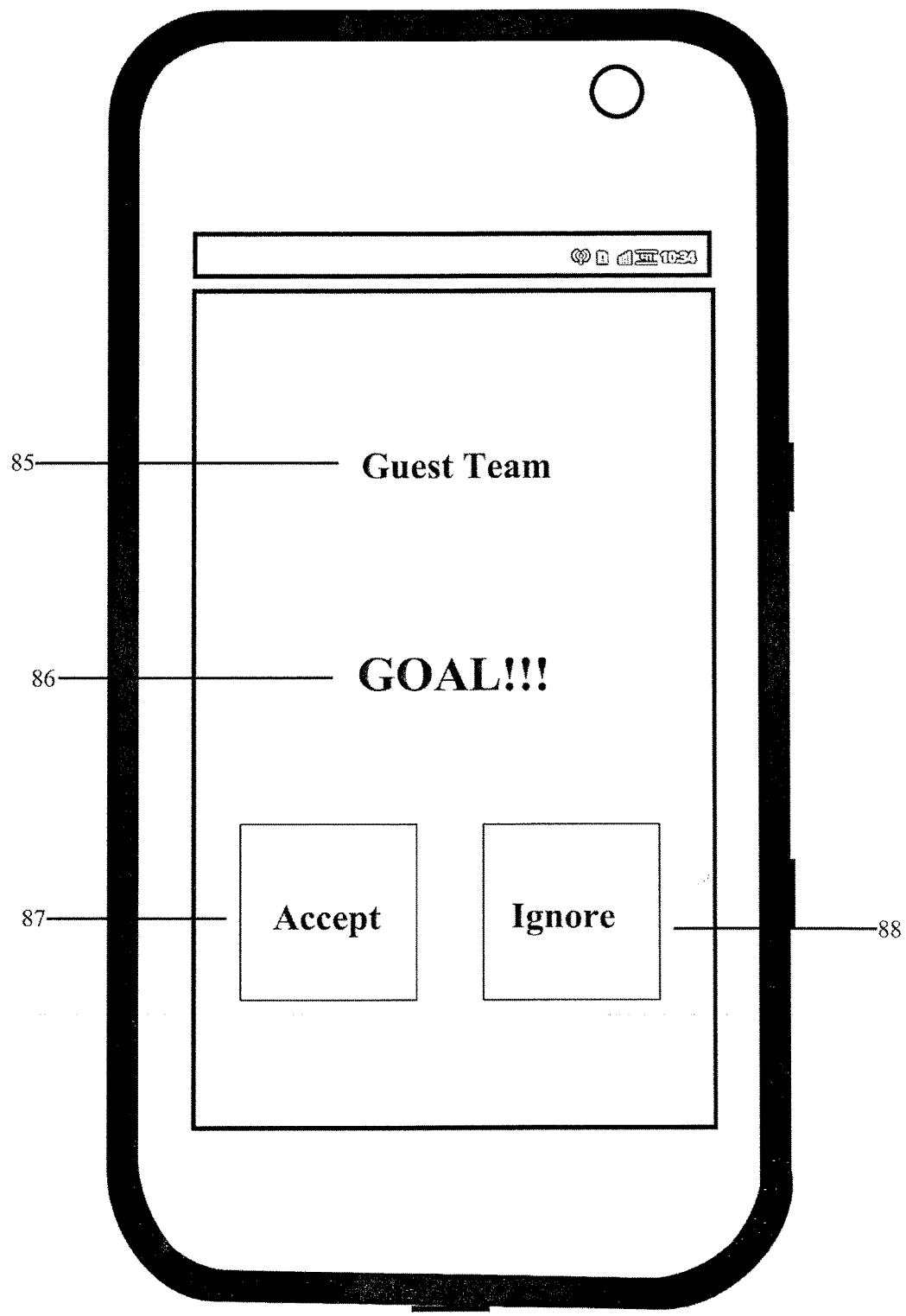
FIG. 26 is a schematic diagram of an inter communication goal alert screen.

An inter communication icon 69 selects a function that allows duplex communication between devices and systems used as part of authorized aids for the referee or the referees and the FB-MM to conduct the match without stopping the game to conduct and resolve a dispute. Examples of such systems include an electro optic goal "reader" to help the referee to make a decision regarding a disputed goal to determine whether the ball completely crossed the goal line. The inter communication receives the information from the device or system and alerts the referee instantly on the FB-MM screen as seen in FIG. 26 announcing a goal scored by the guest team that came from a goal line "reader" device used to automatically determine the position of the ball relative to the goal line.

Figure 21:
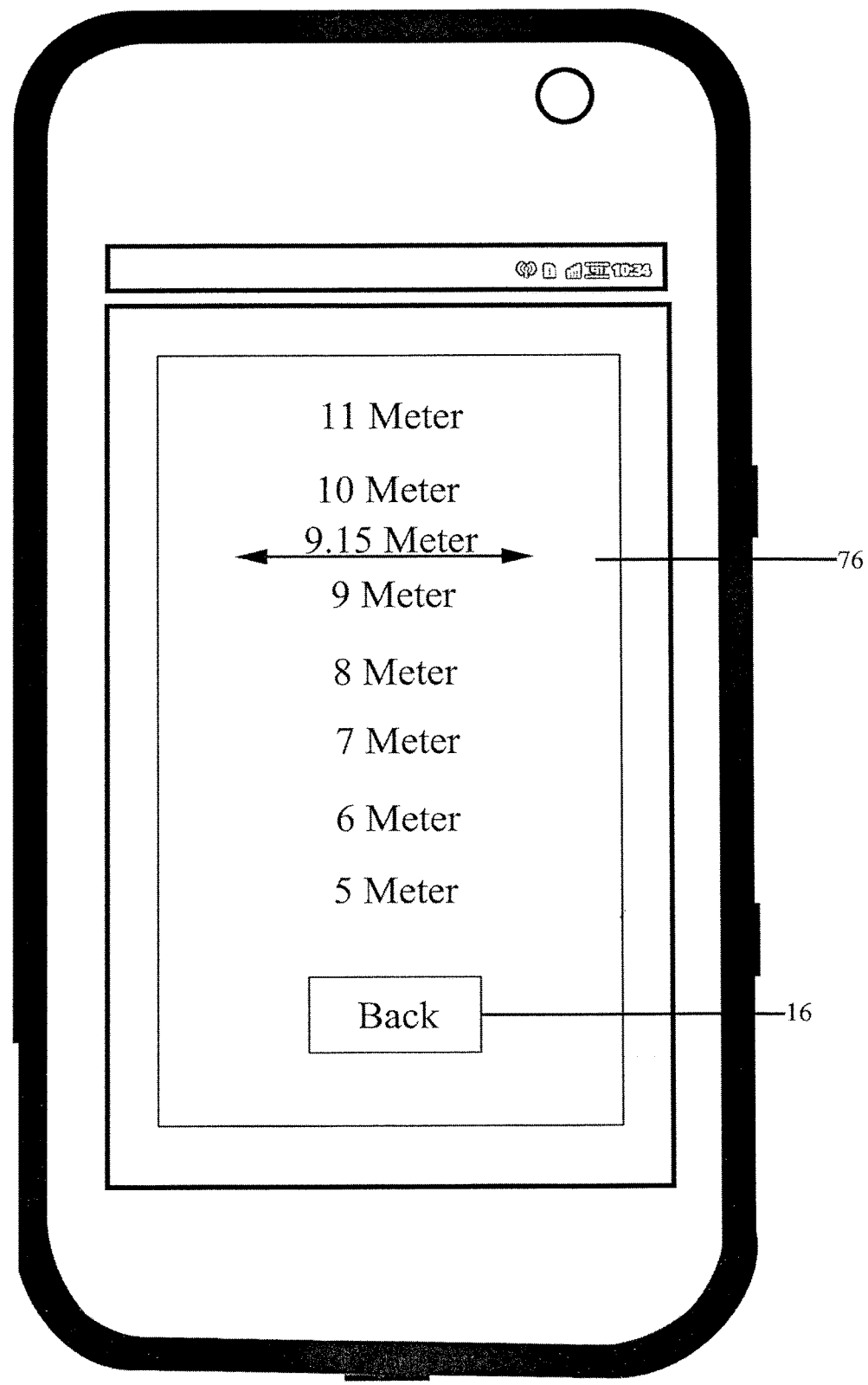
FIG. 21 is a schematic diagram of a distance calculator screen.

Selecting a distance calc. icon 70, launches a measuring system and displays a measuring screen (FIG. 21), for measuring a fixed distance of 10 yards –9.15 meters, corresponding to the allowed distance between the ball and the defending players in a free kick situation. The correct distance is marked on a distance scale 76 in green color when the rest of the scale is marked in red fading in to lighter red towards yellow closer to correct distance, turning green indicating the correct distance was measured. The measuring procedure may be accompanied by a sound, for example, a beeping sound, during the measurement procedure, until a continuous tone is heard to notify the referee a measured distance has been determined. The measurement may be performed by various measuring techniques known to persons having ordinary skill in the art, for example, by a sensor sending a low laser beam directed and pointed to the ball from the place the referee stands, it can be done by an ultrasonic beam done by the same way or by a fixed focus system as used in simple cameras.

Selecting the menu 2 screen substitution icon 71 opens a substitution screen indicating the team players substitutions, as shown by FIG. 19. When the substitution screen is opened from the menu 2 screen, the substitution screen may not be edited (is read only) and shows the status of the substitutions for information only.

Returning to FIG. 12, the penalty kicks button 72, is selected when penalty kicks are needed to declare a winning team when a game of 120 minutes was ended with equal result. Depressing Icon 72 opens screen the penalty kick screen (see FIG. 22, described below). The flip coin button 73 may be selected to navigate to the flip coin screen in the event of a 120 minute game ending with draw (tie) result. The flip coin procedure, described above (FIG. 10), is used to decide whether the home team or the guest team will be the first team to kick the penalty kicks.

The game log button 74 may be used to navigate to a game log screen and launch a game log feature. The FB-MM game log feature records all data input or downloaded regarding a game and every game related event that occurred during the game, at the end of the game, and after the game. The game log feature records all the data and events, for example, names of teams, date and time of game, type of game, place of game, team identification, flip coin result, game start at each half (90 minute, 120 minute, 80 minute, etc.), goals scored, indicating the scoring team, player and scoring time by minute, by minute, yellow card warning by player and minute, second yellow card by player and minute, red card as result of second yellow card warning by player and minute, red card by player and minute, coach or any other personal yellow/red card warning, substitutions by team, minute, players substituted out and in, stoppage time activated and stopped, additive time added, time by game minute and by real clock time, and time by game minute and real clock for end each half or game of any type. The game log feature records all the penalty procedure including flip coin penalty kickers by minutes and name, whether each penalty shot resulted in a score or miss, and a final result by the real time and the game time. The game log feature records inter communication decisions described above, for example, the type of decision and whether it was accepted or ignored, including the minute and time game report sent, and consignees.

Selecting the referee log button 75 launches the referee log feature which collects the entire physical data and statistics of the game for reference or for analysis. The referee log feature records physical data, for example, heart condition distance passed during a game and any data wanted. The referee log may be confidential and is generally not transmitted or revealed to any other FB-MM users or the users of the FB-MM application.

Figure 22:
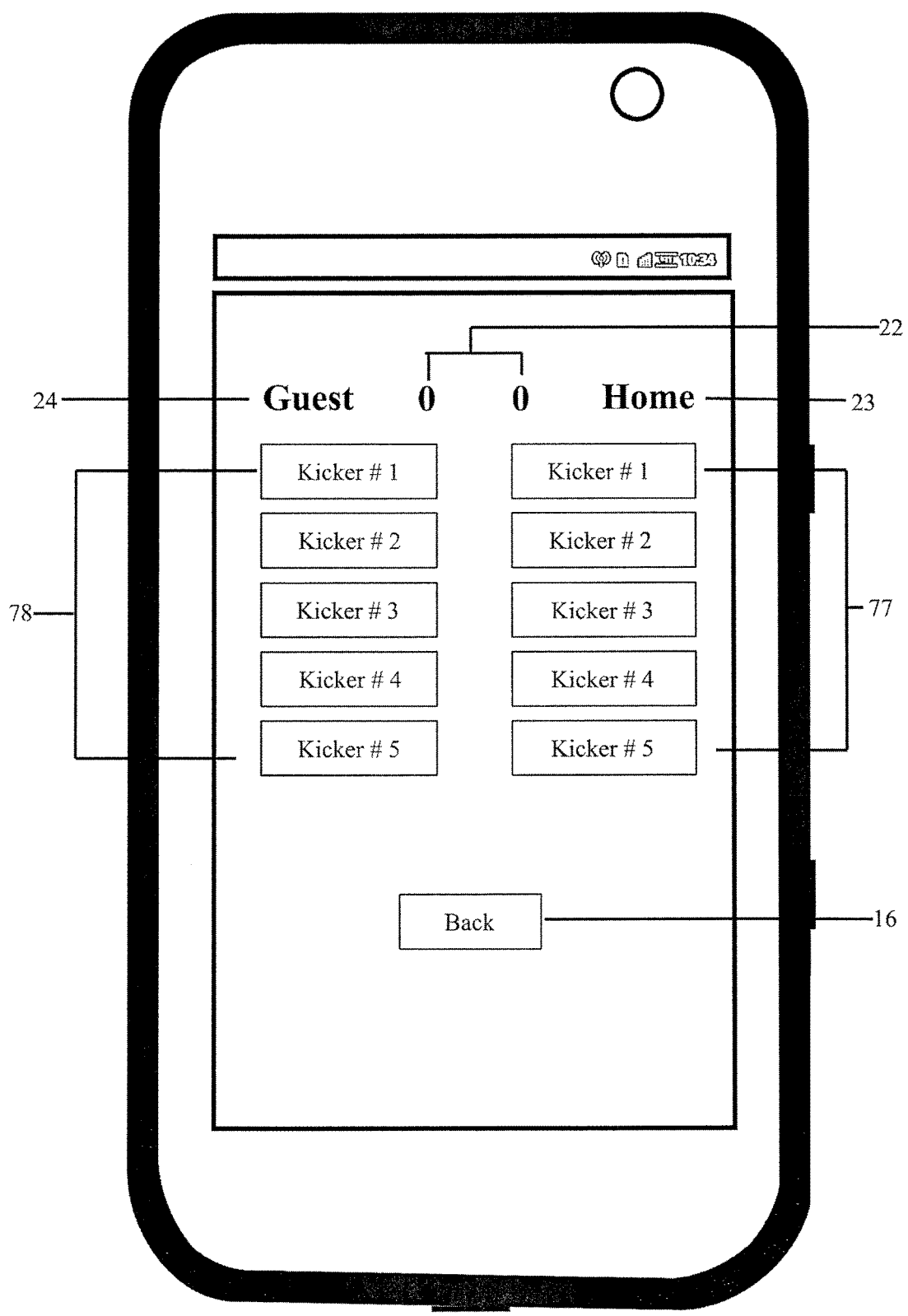
FIG. 22 is a schematic diagram of a penalty kick screen.

FIG. 22 shows the penalty kick screen. The penalty kick screen displays two columns 77, 78 of five player buttons. The home column 77 buttons represents the first five players of the home team to kick in a first round of penalty kicks. The guest column buttons 78 represents the first 5 players of the guest team to kick the first round of penalty kicks. The sets of 5 players to kick the penalty are according to current IFAB/FIFA regulations. The FB-MM may be programmed so that any set number of players or a single a player may participate in the penalty kick. The icon associated with a player currently making a penalty kick is colored white. Icons of kickers who have not yet kicked yet appear in gray. Icons of kickers who have already conducted the penalty kick may be colored in green if scored or colored in red if missed. Of course, other colors may be substituted for white, gray and green icons in alternative embodiments. The icon color coding may clarify the current state of the penalty kick for the referee or other FB-MM users.

Figure 23:
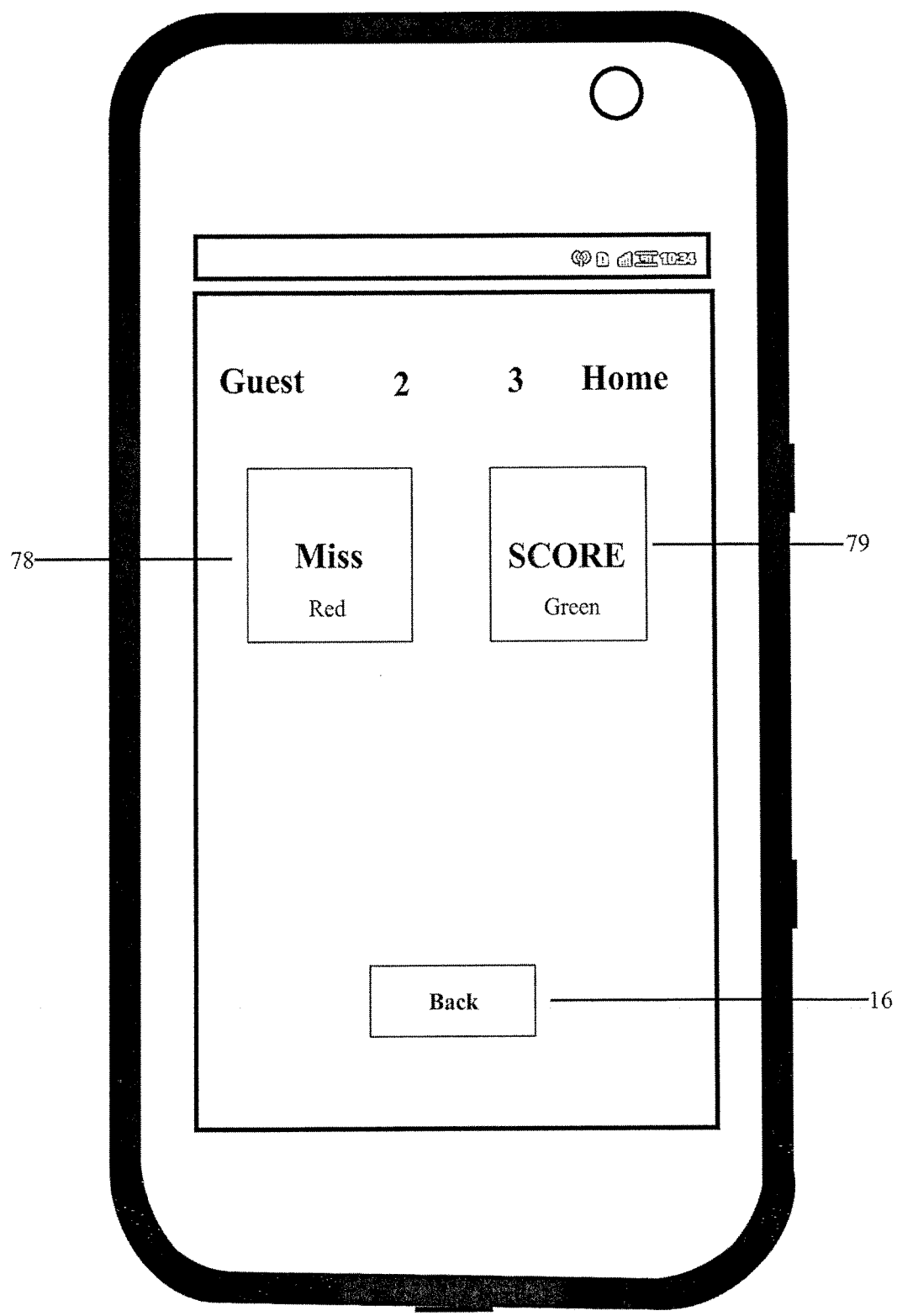
FIG. 23 is a schematic diagram of a score/miss screen.

When a user selects a player icon in columns 77, 78, the score/miss screen is displayed, as shown by FIG. 23. This screen is used to enter the result of the penalty kick for the player corresponding to the selected player icon (FIG. 22). For example, during a penalty kick, the referee may select the current kicker icon from columns 77, 78 (FIG. 22) of the penalty kick screen, opening the score/miss screen, wherein the referee may select a score icon 79 colored in green to declare a goal score by that player or a miss icon 80 colored in red to declare a missed goal. The screen then will change back to the penalty kick screen (FIG. 22) so the user may proceed with the next kicker.

Figure 24:
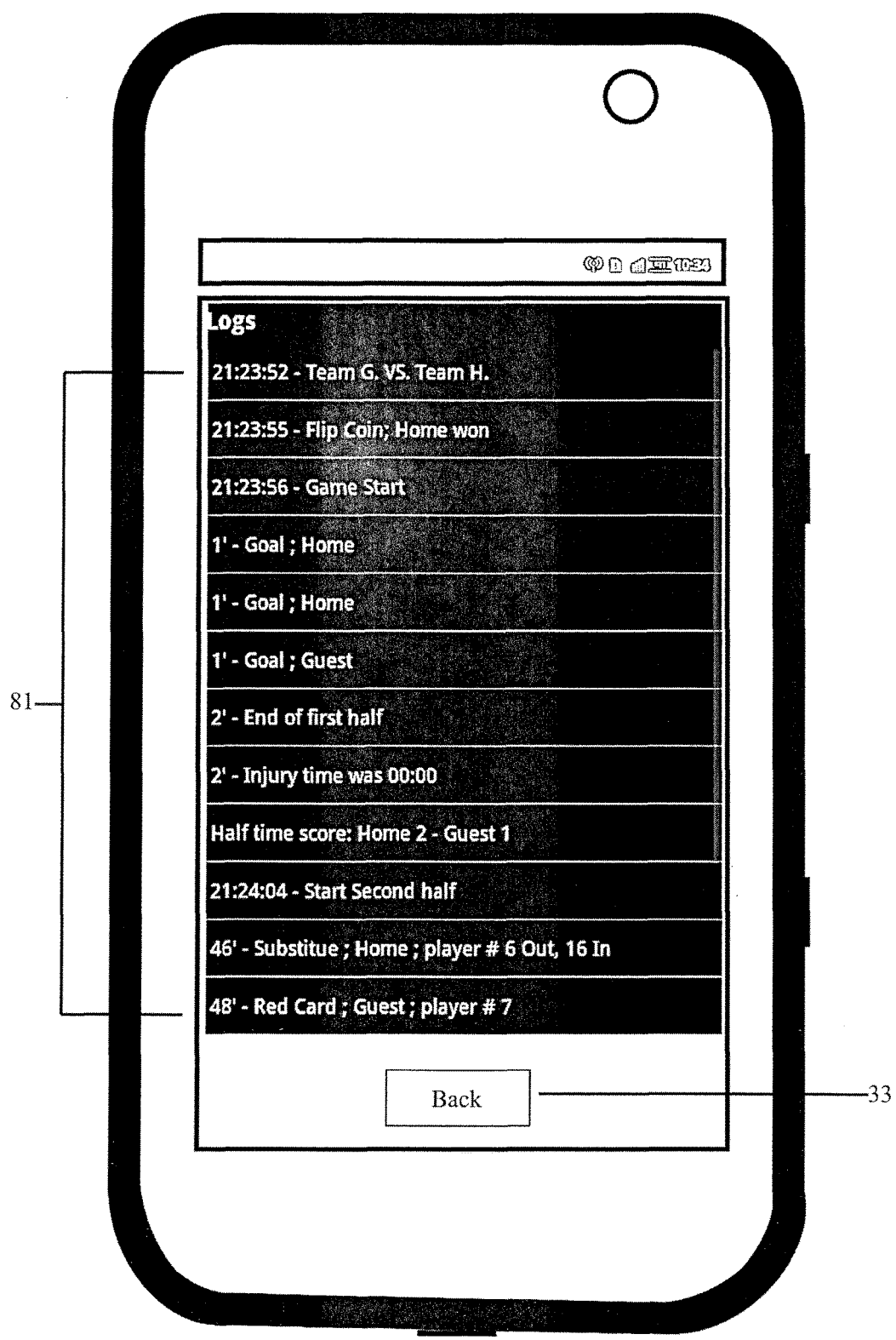
FIG. 24 is a schematic diagram of a game log screen.

FIG. 24 shows a game log screen. The game log report screen displays a game report roll 81 containing events recorded by the FB-MM system. For example, any goals, penalties, or substitutions, the associated player and game time may be included in the game log report. By scrolling up the game report roll the whole report may be viewed. The game log report may be copied and pasted into the final report the referee may at the end of each game, sent and delivered as requested.

Figure 25:
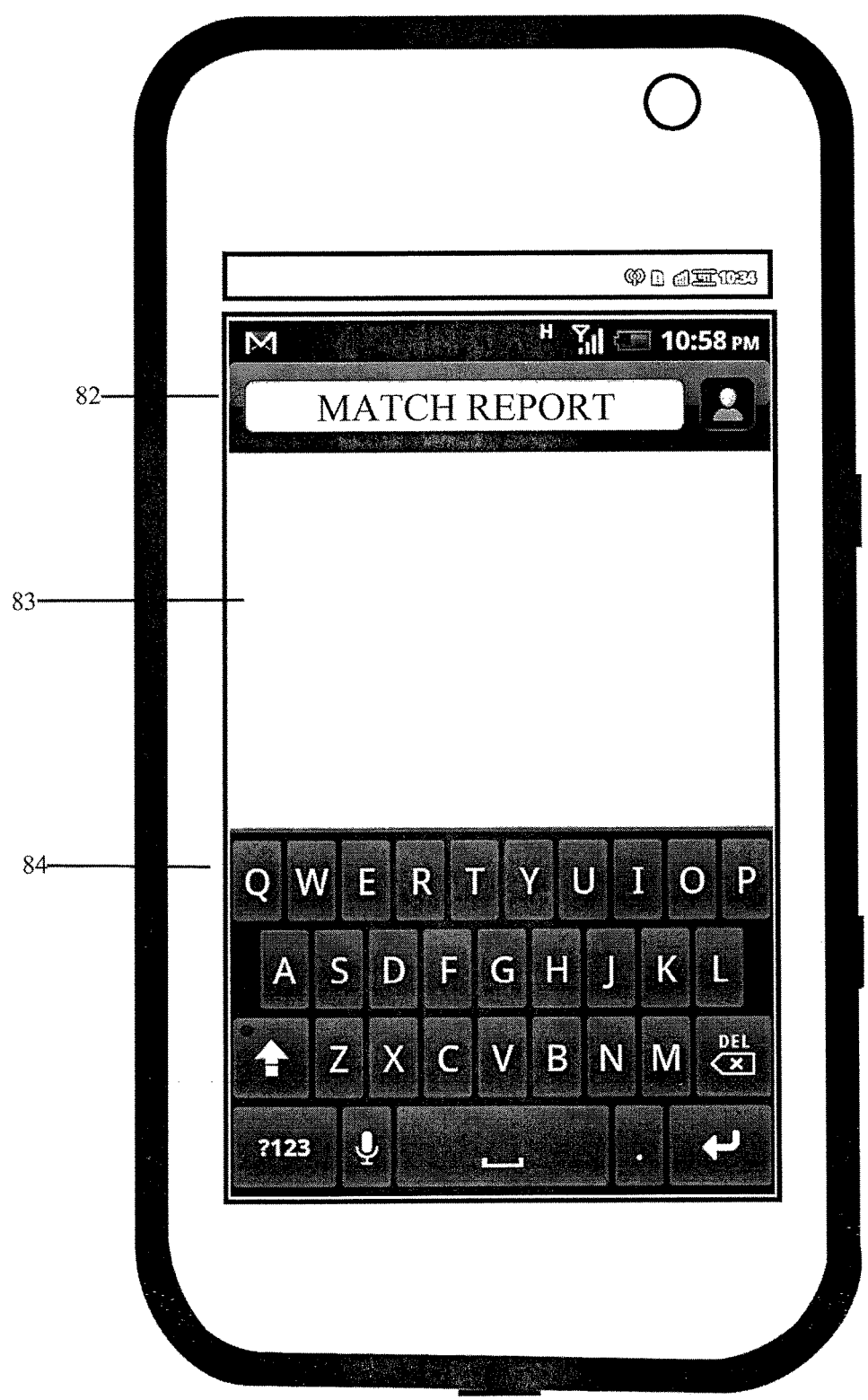
FIG. 25 is a schematic diagram of a match report screen.

FIG. 25 shows the match report screen. The FB-MM provides a utility for writing a game report directly into the system, including the ability to paste the game log report directly into the game report for speed and convenience. A match report title box 82 provides a location to indicate the title of the match report. The FB-MM system automatically transfers game title 11 (FIG. 2) to the match report title box. A board field 83 allows the user to arrange and to add remarks and paste the game log and to edit the final report. A touch screen keyboard 84 may be presented as a tool for writing the match report. For example the touch screen keyboard may be a standard tool provided by the host operating system of the device hosting the FB-MM, for example, a smart phone operating system or tablet computer operating system. However, there is no objection to providing a specialized keyboard specific to the FB-MM application.

FIG. 26 shows an inter-communication goal alert screen. As described above, inter communication alerts allow the FB-MM to accept alerts from external devices or persons tasked with determining if a goal is scored by monitoring whether the ball has crossed the goal line. These persons or devices generate an inter-communication goal alert that is received by the FB-MM, whereupon the FB-MM displays the inter-communication goal alert screen. A team identifier title 85 indicates whether the alert is reporting a goal detected for the home team or guest team. The alert type title 86 indicates the type of event being reported by the event, for example, a goal. The user may accept the alert by selecting the accept button 87. Otherwise, the user may ignore the alert by selecting the ignore button 88. An accepted goal is recorded by the FB-MM and included in the current match score. While an ignored goal is not reflected in the match score, the ignored alert may nevertheless be included in the match log.

Game Follower Application

Figure 27:
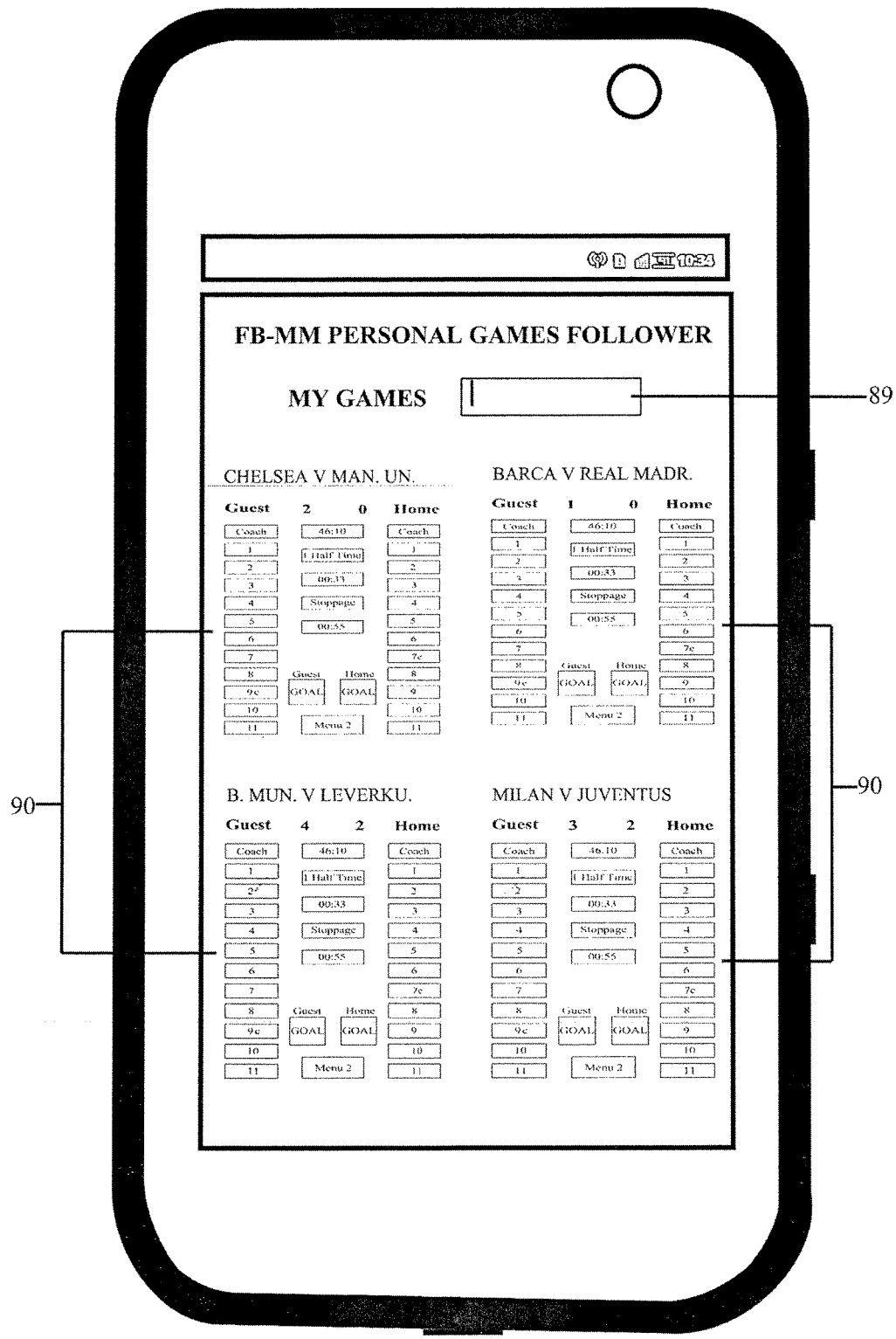
FIG. 27 is a schematic diagram of an exemplary third party application screen.

A second embodiment of the current invention is a FB-MM Personal Games Follower Application, as shown by FIG. 27. This application may be used by any Smartphones, Tablets, computers or any other device compatible with the FR-MM application. The application allows a user to receive complete or partial data transmitted from any referee FB-MM system live or recorded so the user can follow any game played live or previously played in by selecting the FB-MM of a referee any place in the world. The application allows team officials, press, broadcasters, spectators and others to follow a chosen game or games played simultaneously with updated games scores. The application screen displays a four game FB-MM application follower. A my game textbox 89 allows the application user to select games to follow from the FB-MM of a referee. The chosen games 90 are presented on the screen in forms according to the amount of games that were selected. When an event is recorded in a chosen game, the FB-MM application generates a notification, for example, a sound, vibration flashing light, or a combination chosen by the user. A selected game may be presented for a chosen period of time as a single game on full screen.

Operation of the FB-MM

After an opening flip coin operation (see above), the user selects the start game icon 42 (FIG. 11) on the flip coin result screen. The game conducting screen opens, as shown by FIG. 12. The Status Icon 42 shows "Start 1 Half." Selecting the status icon 42 starts the main game clock 38 running, and the status icon shows "1 Half Time". At the end of the first half of the game, selecting the status icon 42 stops the main clock from running and the status icon 42 shows "End of 1 Half" Selecting the status icon 42 again changes the status icon 42 to read "Start 2Half Time." At the end of the second have (generally indicating the end of a game), selecting the status icon 42 stops the main clock 38 and the status changes to "Game End." When a prolonging of 2 halves is needed the procedure is the same as for two regular halves, but the status icon 38 displays "Prol." instead of "Time."

In the event that a first yellow card warning is to be issued to a player, the user selects the number icon from the team player columns 39, 40 corresponding to the number worn on the uniform by the player. As a result, the activity chooser screen (FIG. 13A), or the enhanced activity chooser screen (FIG. 13B) opens, as described above. The referee selects the yellow card icon 48 (FIG. 13A or FIG. 13B), causing the front screen 4a (FIG. 1) and rear screen 4b (FIG. 1A) to be displayed in yellow color with the player identification number presented in black in the center of the screens 4a, 4b, as shown by FIG. 14. Pressing any place on the screen FIG. 14 will change the screen to display the game conducting screen (FIG. 12) and the warned player icon in on columns 39, 40 is presented in yellow.

In the event a second yellow card warning is to be issued to a player, selecting the player icon corresponding to a player who already has a yellow card warning repeats substantially the same procedure as the first yellow card warning. Touching any place on screen FIG. 14 will change the screens 4a, 4b, to be colored in red with the player identification number presented in black in the center of the screens, FIG. 15. Depressing any place on screen FIG. 15 will change the screen to screen FIG. 12 and the worn player icon on columns 39, 40 will be presented in red.

In the event that a red card warning is to be issued to a player, the user selects the number icon from the team player columns 39, 40 corresponding to the number worn on the uniform by the player. As a result, the activity chooser screen (FIG. 13A), or the enhanced activity chooser screen (FIG. 13B) opens, as described above. The referee selects the red card icon 49 (FIG. 13A or FIG. 13B), causing the front screen 4a (FIG. 1) and rear screen 4b (FIG. 1A) to be displayed in red color with the player identification number presented in black in the center of the screens 4a, 4b, as shown by FIG. 15. Pressing any place on the screen FIG. 15 changes the screen to display the game conducting screen (FIG. 12) and the warned player icon in on columns 39, 40 is presented in red.

In the event a blank yellow card is to be presented, selecting the Coach Icon in the coach and players columns 39, 40 changes to the card chooser screen (FIG. 16). Selecting the yellow card icon 48 changes the card chooser screen (FIG. 16) to the blank yellow card screen FIG. 17 and the whole screens 4a, 4b are colored in yellow. Selecting any place on the blank yellow card screen (FIG. 17) changes the screen to the game conducting screen (FIG. 12) and the warned coach icon in columns 39, 40 is presented in yellow.

In the event a blank red card is to be presented, selecting the Coach Icon in the coach and players columns 39, 40 changes to the card chooser screen (FIG. 16). Selecting the red card icon 49 changes the card chooser screen (FIG. 16) to the blank red card screen FIG. 18 and the whole screens 4a, 4b are colored in red. Selecting any place on the blank red card screen (FIG. 18) changes the screen to the game conducting screen (FIG. 12) and the warned coach icon in columns 39, 40 is presented in red.

The FB-MM can manage goal scoring in two ways. First, when the guest team scores a goal, the referee selects the guest goal recording indicator 46a and the goal is recorded for the Guest team. The guest team goal is instantly indicated on the Goal Scoring Counter 35a. When a Home team scores a goal, the referee selects the home guest goal recording indicator 46b and the goal is recorded for the home team. The home team goal will instantly be indicated on the Goal Scoring Counter 35b. In this procedure only the amount of goals are recorded for each team, but the player scoring the goal is not recorded.

The second way of recording a goal is recording a goal with the goal scorer name. Selecting a player that scored a goal on the team players columns 39, 40 in the game conducting screen (FIG. 12), opens screen FIG. 13A. Depressing the goal icon 50 changes the screen to screen FIG. 12 and the goal will be recorded instantly on the goal recording counter 35a, or 35b related to the home/guest team scorer.

The substitution procedure may take place during the game or during the intermission. Selecting the number of a player that is to be substituted out, on team players columns 39, 40, in the game conducting screen (FIG. 12), the screen change to screen FIG. 13A. Selecting the substitution icon 51 changes the screen to the substitution screen (FIG. 19). Selecting the icon corresponding to the number of player that is to be substituted in on columns 64, 65 changes the screen to the game conducting screen (FIG. 12) and the number of the substituted out player is replaced by the number of the substituted in player on columns 39, 40. The Substitution screen FIG. 19 shows the substitution that was made by grey colored the substituted in the icon of the player in columns 64, 65 and the accumulated number of substitution made by the team will be shown on Number of Subs 66, 67.

A penalty kicks procedure may occur in case of draw in game result after 120 minutes of game played and the game has to conduct penalty kicks. The FB-MM may manage the whole procedure. First a Flip Coin 73 procedure will be done as explained on 30 FIG. 10. At the end of the Flip Coin procedure, selecting the back icon 21 will return to the Menu 2 screen (FIG. 20). By selecting the penalty kicks icon 72 on the Menu 2 screen (FIG. 20), the screen changes to the penalty kick screen (FIG. 22). Two columns, 77, 78, represent the players of Penalty kickers 77 represent Home team kickers and 78, represent Guest team kickers. The kickers Icons will be white before the kick was executed. The first team to kick as decided by the flip coin will start with kicker #1, the referee will select the kicker Icon and the screen will change to screen FIG. 23, after the penalty kick was done the referee will select Score 79, colored in green, if the player scored a goal and the screen changes back to the penalty kick screen (FIG. 22), the score will be recorded on Goal Scoring Counter 35*a*, 35*b*, and the Icon of kicker #1 on columns, 77, 78, will change to green. If kicker #1 misses the penalty kick the referee select the Miss Icon FIG. 23, colored in red, the screen changes back to the penalty kick screen (FIG. 22), no score will be recorded on the goal scoring counter 35*a*, 35*b*, in the penalty kick screen (FIG. 22), and the kicker #1 Icon on columns 77, 78, changes to red. This procedure is repeated by the referee with the rest of the kickers according to the game rules.

System

Figure 28:
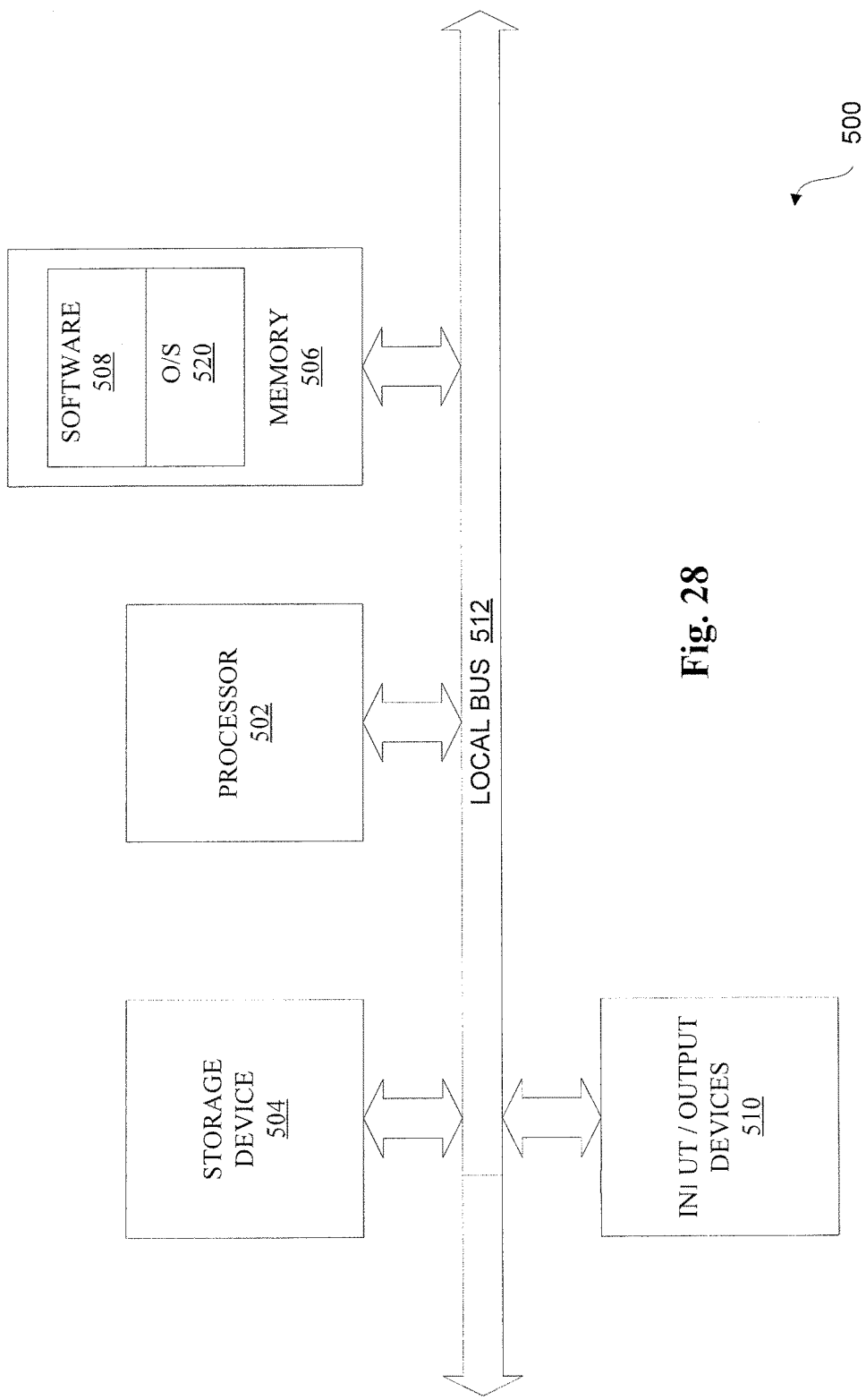
FIG. 28 is a schematic diagram illustrating an example of a system for executing functionality of the present invention.

As previously mentioned, the present system for executing the functionality described in detail above may be a portable computing device, an example of which is shown in the schematic diagram of FIG. 28. The system 500 contains a processor 502, a storage device 504, a memory 506 having software 508 stored therein that defines the above-mentioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a touchscreen, keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modern; for accessing another device, system, or network), a radio frequency (RF), wireless (WWI), BluTooth, ZigBee or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

Method

Figure 29:
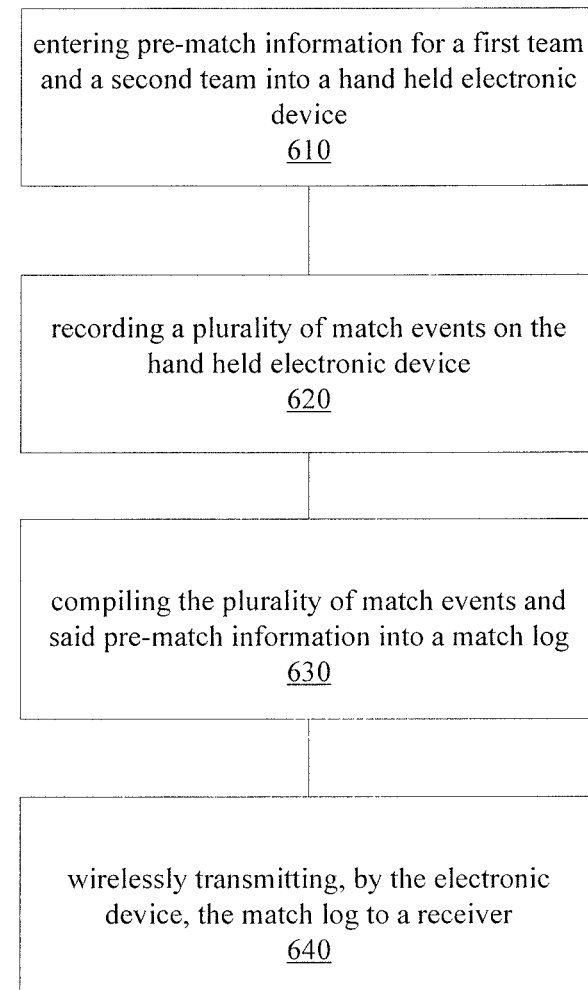
FIG. 29 is a flowchart of a first embodiment of a method for managing a football match.

FIG. 29 shows a flowchart of a first exemplary method for managing a football match. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

A step includes entering pre-match information for a first team and a second team into a hand held computer device, as shown by block 610. A step includes recording a plurality of match events on the hand held computer device, as shown by block 620. A step includes compiling the plurality of match events and the pre-match information into a match log, as shown by block 630. A step includes wirelessly transmitting, by the computer device, the match log to a receiver, as shown by block 640.

In summary, it will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A device for use with an occurrence in a place during a time interval, the device comprising:
    a software and a processor for executing the software, said software including an operating system;
    a memory storing said software coupled to said processor;
    an input component coupled to said processor for capturing input from a person;

a first display coupled to said processor for presenting visual information to the person;
a second display coupled to said processor;
a distance measuring meter coupled to said processor for measuring a distance and displaying the measured distance on said first display, said distance measuring meter is based on light, laser, sound, ultrasonic sound, or optics;
a wireless transmitter coupled to said processor for wirelessly transmitting information to a unit; and
a hand held enclosure for housing said processor, said memory, said input component, said wireless transmitter, and said first display,
wherein said enclosure comprises two opposed first and second exterior surfaces, and wherein said first display is attached to said first exterior surface and said second display is attached to said second exterior surface, and
wherein the device is operative to receive an information from the person using said input component, to store the information in said memory, to display the information on said first display, and to transmit the information via said wireless transmitter to the unit.

2. The device according to claim 1 wherein the occurrence is a sport event, the place is a sport field, and the time interval is the sport event duration.

3. The device according to claim 2 wherein the sport event duration is a game duration, the sport event is a match between first and second teams, each of the teams is associated with a team name, team players, and a team coach, and the match is managed by a referee team headed by a primary referee.

4. The device according to claim 3 wherein the sport event is a soccer game, the place is a soccer field, and the time interval is a soccer game duration.

5. The device according to claim 3 wherein the information include pre-sport event information known before the sport event initiation, and sport event occurrences occurring during the sport event duration.

6. The device according to claim 5 wherein the pre-sport event information comprising at least two items out of a group of items consisting of the sport field identification, the sport field location, the match date, the scheduled game duration, the first team name, the second team name, the first team players names, the second team players names, the first team coach name, the second team coach name, the primary referee name, and the referee team members names.

7. The device according to claim 5 wherein sport event occurrences comprising the occurrences, or the time of the occurrences during the match, of least two items out of a group of items consisting of: a flip coin result, a flip coin win team name, an actual start time of the match, an actual game duration, a time addition to the planned game duration, a goal score, a number of yellow card warnings of the first team, a number of yellow card warnings of the second team, a number of yellow card warnings of each player of the teams, a goal score, a number of red cards of the first team, a number of red cards of the second team, a red card of each player of the teams, a penalty, a player substitution, a penalty kick, and a distance measurement.

8. The device according to claim 1 wherein said processor is a single-core or multi-core processor, a Central Processing Unit (CPU), a microprocessor, or a macroprocessor, wherein said memory is a volatile memory or a non-volatile memory, and wherein the input component is a button, touchscreen, keyboard, mouse, scanner, or a microphone.

9. The device according to claim 1 wherein said wireless transmitter is part of a modem (modulator/demodulator) using RF (Radio-Frequency) based Wireless Local Area Network (WLAN), Wireless Personal Area Network (WPAN), or Wireless Wide Area Network (WWAN).

10. The device according to claim 1 wherein the WLAN is according to, or based on, WiFi standard, wherein the WPAN is according to, or based on, Bluetooth or ZigBee standard, wherein the WWAN is based on cellular or satellite communication, and wherein the device is addressable in the wireless network.

11. The device according to claim 1 wherein the device is operative to transmit at least part of the information over the Internet.

12. The device according to claim 1 further comprising a cellular telephone or a Smartphone.

13. The device according to claim 1 further operative to display yellow or red background color on said first and second displays in response to the person input via said input component.

14. The device according to claim 13 wherein the occurrence is a sport event, the sport event is a match between first and second teams, and each of the teams is associated with a team name, team players, wherein the device is further operative to display a player number in a foreground on said background on said first and second displays in response to the person input via said input component.

15. The device according to claim 1 further comprising a timer coupled to said processor for measuring a lapsed or remaining time of the interval, wherein the lapsed or remaining time is displayed in minutes and seconds on said first display.

16. The device according to claim 15 wherein said timer is activated and stopped in response to the person input via said input component, and wherein the person is notified after the lapsing of a predetermined time interval.

17. The device according to claim 1 further comprising a random number generator coupled to, or part of, said processor, for generating a random number.

18. The device according to claim 17 wherein the occurrence is a sport event, the sport event is a match between first and second teams, wherein the device is further operative to select one out of the first or second teams based on the random number, and wherein the selection is displayed on said first display.

19. A system comprising:
a first device according to claim 1 for use with a first occurrence, said first device operative to wirelessly transmit a first information first occurrence over the Internet;
a second device according to claim 1 for use with a second occurrence distinct from the first occurrence, said first device operative to wirelessly transmit a second information second occurrence over the Internet; and
a third device comprising a display, wherein said third device is operative to receive from the Internet and display in real-time the first and second information on said third device display.

20. The system according to claim 19 wherein said third device further comprising an input component coupled to said third device display, for capturing input from a second person, and wherein said third device is operative to display on said third device display part of the first and second information in response to the second person input via said third device input component.

* * * * *